US011061487B2

(12) United States Patent
Kwak et al.

(10) Patent No.: US 11,061,487 B2
(45) Date of Patent: Jul. 13, 2021

(54) ELECTRONIC DEVICE FOR PERFORMING COMMUNICATION WITH PEN INPUT DEVICE WITH MULTIPLE INPUT BUTTONS AND METHOD OF CONTROLLING SAME

(71) Applicant: Samsung Electronics Co., Ltd., Gyeonggi-do (KR)

(72) Inventors: Kyujin Kwak, Gyeonggi-do (KR); Minsoo Kim, Gyeonggi-do (KR); Kwangho Shin, Gyeonggi-do (KR); Jinman Kim, Gyeonggi-do (KR); Hyunsuk Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/723,515

(22) Filed: Dec. 20, 2019

(65) Prior Publication Data
US 2020/0209992 A1 Jul. 2, 2020

(30) Foreign Application Priority Data
Dec. 28, 2018 (KR) .......................... 10-2018-0173047

(51) Int. Cl.
*G06F 3/033* (2013.01)
*G06F 3/041* (2006.01)
(Continued)

(52) U.S. Cl.
CPC .......... *G06F 3/03545* (2013.01); *H04W 4/40* (2018.02); *G06F 3/044* (2013.01); *H04M 1/725* (2013.01)

(58) Field of Classification Search
CPC ................................ G06F 1/1656; G06F 3/044
See application file for complete search history.

(56) References Cited

U.S. PATENT DOCUMENTS

2006/0068851 A1* 3/2006 Ashman, Jr. .......... G06F 1/1626
455/566
2011/0012849 A1 1/2011 Cho et al.
(Continued)

FOREIGN PATENT DOCUMENTS

JP      2018-514008      5/2018
KR      1020140076261   6/2014
(Continued)

OTHER PUBLICATIONS

International Search Report dated Mar. 3, 2020 issued in counterpart application No. PCT/KR2019/016260, 7 pages.

*Primary Examiner* — Nan-Ying Yang
(74) *Attorney, Agent, or Firm* — The Farrell Law Firm, P.C.

(57) ABSTRACT

An electronic device including a housing including a first inner space and a hole leading to the first inner space, a first wireless communication circuit positioned inside the housing, a stylus pen insertable into the first inner space through the hole, the stylus pen including an elongated pen housing including a second inner space elongated between a first end and a second end, a pen tip disposed at the first end, a pushable first button disposed at the second end, and a second wireless communication circuit positioned inside the pen housing and configured to wirelessly transmit and/or receive a signal to/from the first wireless communication circuit, a processor positioned inside the housing and operatively connected with the first wireless communication circuit, and a memory positioned inside the housing and operatively connected with the processor, wherein the memory is configured to store instructions that, when executed, enable the processor to disregard a first signal transmitted by the second wireless communication circuit as the pushable first button is pushed while the stylus pen is in the housing, receive a second signal transmitted by the (Continued)

second wireless communication circuit as the pushable first button is pushed while the stylus pen is outside the housing, and perform a selected function in response to the received second signal.

18 Claims, 20 Drawing Sheets

(51) Int. Cl.
*G06F 3/045* (2006.01)
*G06F 3/0354* (2013.01)
*H04W 4/40* (2018.01)
*G06F 3/044* (2006.01)
*H04M 1/725* (2021.01)

(56) References Cited

U.S. PATENT DOCUMENTS

| 2013/0207454 | A1* | 8/2013 | Stellick | H02J 4/00 |
|---|---|---|---|---|
| | | | | 307/1 |
| 2014/0035887 | A1 | 2/2014 | Klm | |
| 2014/0160045 | A1 | 6/2014 | Park et al. | |
| 2015/0370518 | A1 | 12/2015 | Ramchandran | |
| 2016/0306444 | A1 | 10/2016 | Fleck | |
| 2017/0322642 | A1 | 11/2017 | Zhang et al. | |

FOREIGN PATENT DOCUMENTS

| KR | 10-2015-0112994 | 10/2015 |
|---|---|---|
| KR | 10-2016-0096912 | 8/2016 |

\* cited by examiner

ELECTRONIC DEVICE FOR PERFORMING COMMUNICATION WITH PEN INPUT DEVICE WITH MULTIPLE INPUT BUTTONS AND METHOD OF CONTROLLING SAME

CROSS-REFERENCE TO RELATED APPLICATION(S)

This application is based on and claims priority under 35 U.S.C. § 119 to Korean Patent Application No. 10-2018-0173047, filed on Dec. 28, 2018, in the Korean Intellectual Property Office, the disclosure of which is herein incorporated by reference herein in its entirety.

BACKGROUND

1. Field

The disclosure relates to a pen input device with multiple input buttons and an electronic device that performs communication as well as a method of controlling the electronic device.

2. Description of Related Art

More and more services and additional functions are being provided through electronic devices, e.g., smartphones, or other portable electronic devices. To meet users' various needs and raise use efficiency of electronic devices, communication service carriers or device manufacturers are competing to develop electronic devices with differentiated and diversified functionalities. Accordingly, various functions that are provided through electronic devices are evolving more and more.

Electronic devices are being developed to be able to receive various inputs from the user through a specific input device (e.g., a stylus pen) via wireless communication with the electronic devices. An electronic device may receive specific inputs through a touchscreen of the electronic device from a pen input device (e.g., a stylus pen).

The electronic device may detect magnetic fields produced from the stylus pen using electro magnetic resonance (EMR). The electronic device may identify a position of the stylus pen (e.g., whether the stylus pen is positioned over a display of the electronic device or positioned inside the electronic device) based on the electromagnetic force produced by the magnetic field per channel.

The stylus pen may be connected with an electronic device (e.g., a stylus pen-equipped smartphone) via short-range communication (e.g., Bluetooth low energy (BLE)). The user of the electronic device may use various functions (e.g., running an application) using the stylus pen connected with the electronic device via short-range communication.

A stylus pen with one input button provided on a housing thereof may be implemented to transmit or receive wireless signals to/from an electronic device using a plurality of short-range communication schemes using the input button. For example, the input button of the stylus pen may be operated as a button for changing a frequency of EMR signals while the stylus pen is positioned within a predesignated first distance from the display (or touchscreen) of the electronic device (e.g., when the distance between the touchscreen and the stylus pen is less than or equal to 10 cm). According to an embodiment, when the stylus pen is positioned within a predesignated second distance from the display of the electronic device (e.g., when the distance between the touchscreen and the stylus pen is less than or equal to 10 m), the input button may be operated as a button for BLE wireless communication. In this case, when the stylus pen is positioned within the first distance from the display of the electronic device, the input button may not operate as a button for BLE wireless communication. Thus, a need exists for technology for using a plurality of short-range communication schemes by equipping a stylus pen with a plurality of input buttons.

The above information is presented as background information only to assist with an understanding of the disclosure. No determination has been made, and no assertion is made, as to whether any of the above might be applicable as prior art with regard to the disclosure.

SUMMARY

An aspect of the present disclosure provides a stylus pen with a plurality of buttons which are able to use a plurality of communication schemes.

Another aspect of the present disclosure provides an electronic device capable of wirelessly communicating with a stylus pen with a plurality of buttons which are able to use a plurality of communication schemes.

Another aspect of the present disclosure provides a method of controlling a stylus pen with a plurality of buttons which are able to use a plurality of communication schemes.

Another aspect of the present disclosure provides a method of controlling an electronic device capable of wirelessly communicating with a stylus pen with a plurality of buttons which are able to use a plurality of communication schemes.

In accordance with an aspect of the present disclosure, an electronic device is provided. The electronic device includes a housing including a first inner space and a hole leading to the first inner space, a first wireless communication circuit positioned inside the housing, a stylus pen insertable into the first inner space through the hole, wherein the stylus pen includes an elongated pen housing including a second inner space elongated between a first end and a second end, a pen tip disposed at the first end, a pushable first button disposed at the second end, and a second wireless communication circuit positioned inside the pen housing and configured to wirelessly transmit and/or receive a signal to/from the first wireless communication circuit, a processor positioned inside the housing and operatively connected with the first wireless communication circuit, and a memory positioned inside the housing and operatively connected with the processor, wherein the memory is configured to store instructions that, when executed, enable the processor to disregard a first signal transmitted by the second wireless communication circuit as the pushable first button is pushed while the stylus pen is in the housing, receive a second signal transmitted by the second wireless communication circuit as the pushable first button is pushed while the stylus pen is outside the housing, and perform a selected function in response to the received second signal.

According to another aspect of the present disclosure, a method for controlling an electronic device is provided. The method includes disregarding a first signal transmitted by a stylus pen as a pushable first button of the stylus pen is pushed while the stylus pen is in a housing of the electronic device; receiving a second signal transmitted by the stylus pen as the pushable first button is pushed while the stylus pen is outside the housing; and performing a selected function in response to the received second signal.

BRIEF DESCRIPTION OF THE DRAWINGS

The above and other aspects, features, and advantages of the present disclosure will be more apparent from the following detailed description taken in conjunction with the accompanying drawings, in which:

FIG. 1 is a block diagram illustrating an electronic device in a network environment according to an embodiment.

DETAILED DESCRIPTION

Figure 1:
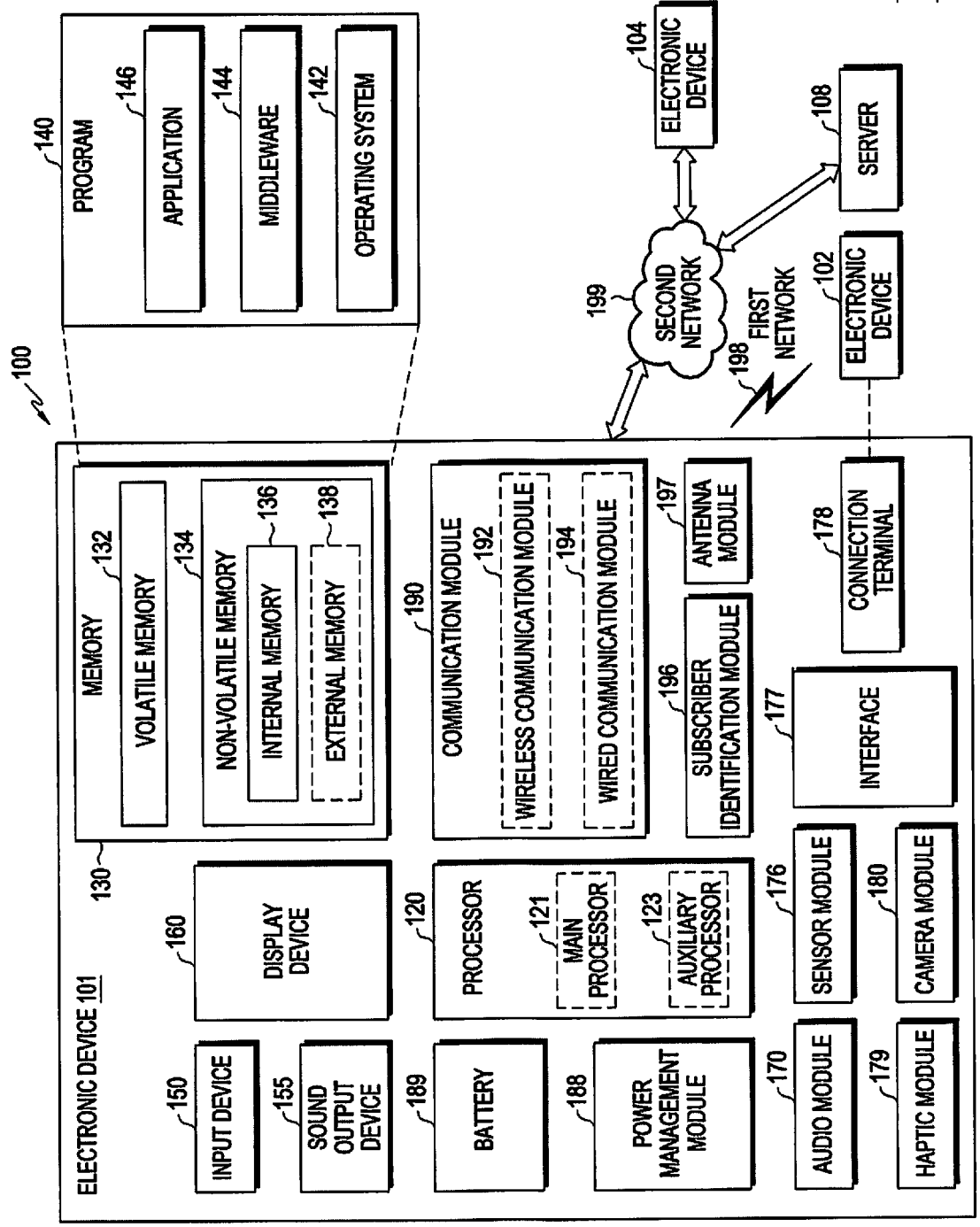

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, e.g., software (e.g., a program 140) to control at least one other component (e.g., a hardware or software component) of the electronic device 101 connected with the processor 120 and may process or compute various data. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121 or to be specific to a specified function. The auxiliary processor 123 may be implemented as separate from or as part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing recordings, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain a sound through the input device 150 or output a sound through the sound output device 155 or an external electronic device (e.g., an electronic device 102 (e.g., a speaker or a headphone) directly or wirelessly connected with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or wireless communication channel between the electronic device 101 and an external electronic device (e.g., the electronic device 102, the electronic device 104, or the server 108) and performing communication through the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The first and second external electronic devices 102 and 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
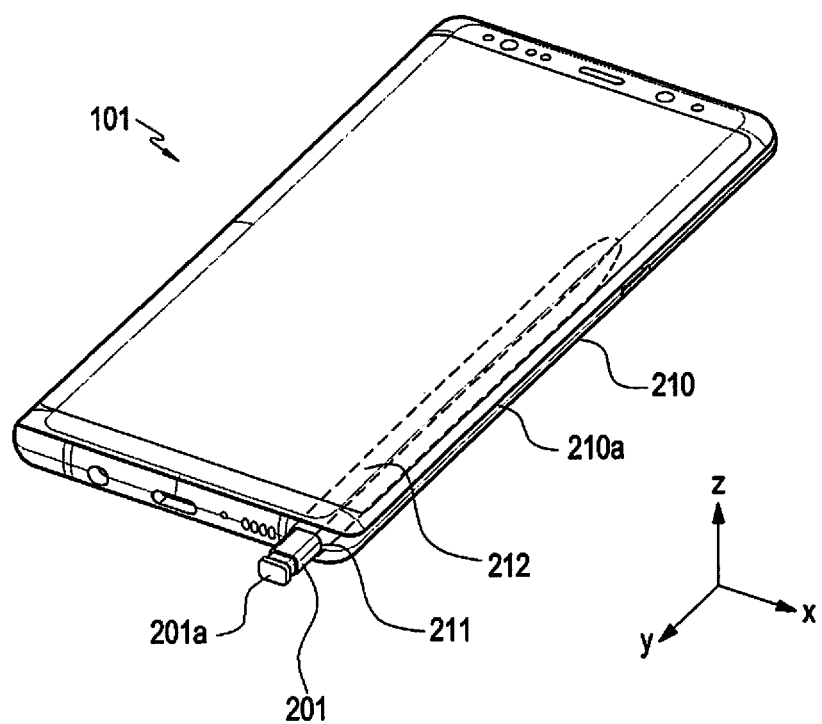
FIG. 2 is a perspective view illustrating an electronic device including a stylus pen according to an embodiment.

FIG. 2 is a perspective view illustrating an electronic device 101 including a stylus pen 201 (e.g., the electronic device 102 of FIG. 1) according to an embodiment. According to an embodiment, the stylus pen 201 may correspond to the input device 150 of FIG. 1 but rather than the electronic device 102 of FIG. 1.

Referring to FIG. 2, according to an embodiment, the electronic device 101 may include the configuration shown in FIG. 1 and may have a structure where the stylus pen 201 may be inserted therein. The electronic device 101 may include a housing 210, and a hole 211 may be formed in a portion of the housing 210, e.g., a portion of a side surface 210a. The electronic device 101 may include a first inner space 212 which is a storage space connected with the hole 211, and the stylus pen 201 may be inserted into the first inner space 212. In the embodiment shown, the stylus pen 201 may have a pushable first button 201a at an end thereof to enable the stylus pen 201 to be easily pulled out of the first inner space 212 of the electronic device 101. When the first button 201a is pushed, a repulsive mechanism (e.g., at least one elastic member, e.g., a spring) configured in association with the first button 201a may be operated to allow the stylus pen 201 to be removed from the first inner space 212.

Figure 3A:
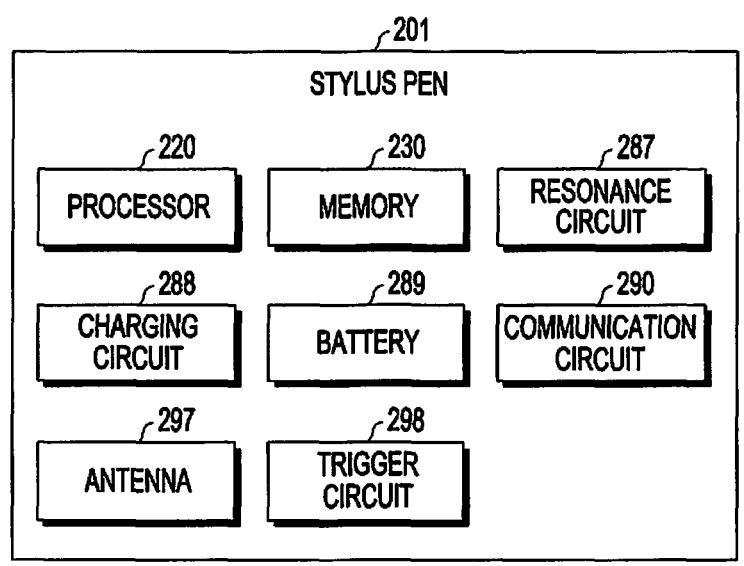
FIG. 3A is a block diagram illustrating a stylus pen according to an embodiment.

FIG. 3A is a block diagram illustrating a stylus pen (e.g., the stylus pen 201 of FIG. 2) according to an embodiment.

Referring to FIG. 3A, according to an embodiment, the stylus pen 201 may include a processor 220, a memory 230, a resonance circuit 287, a charging circuit 288, a battery 289, a communication circuit 290, an antenna 297, and/or a trigger circuit 298. According to an embodiment, the processor 220, at least part of the resonance circuit 287, and/or at least part of the communication circuit 290 of the stylus pen 201 may be configured in the form of an integrated circuit (or chip) or on a printed circuit board. The processor 220, the resonance circuit 287, and/or the communication circuit 290 may be electrically connected with the memory 230, the charging circuit 288, the battery 289, the antenna 297, or the trigger circuit 298. According to an embodiment, the stylus pen 201 may be configured only of a resonance circuit and a button.

The processor 220 may include a customized hardware module or a generic processor configured to execute software (e.g., an application program). The processor 220 may include a hardware component (e.g., a function) or a software element (e.g., a program) including at least one of a communication module or a module to manage the state or environment of the stylus pen 201, an input/output interface, a data measuring module, and various sensors provided in the stylus pen 201. The processor 220 may include one of, e.g., hardware, software, or firmware, or a combination of two or more thereof. According to an embodiment, the processor 220 may receive a proximity signal corresponding to an electromagnetic signal generated from a digitizer (e.g., the display device 160) of the electronic device 101 through the resonance circuit 287. When the proximity signal is identified, the processor 220 may control the resonance circuit 287 to transmit an EMR input signal to the electronic device 101.

The memory 230 may store information related to the operation of the stylus pen 201. For example, the information may include information for communicating with the electronic device 101 and frequency information related to the input operation of the stylus pen 201.

The resonance circuit 287 may include at least one of a coil, an inductor, or a capacitor. The resonance circuit 287 may be used for the stylus pen 201 to generate a signal having a resonance frequency. For example, to generate the signal, the stylus pen 201 may use at least one of an EMR scheme, an active electrostatic (AES) scheme, or an electrically coupled resonance (ECR) scheme. When the stylus pen 201 transmits signals via the EMR scheme, the stylus pen 201 may generate a signal having a resonance frequency based on an electromagnetic field generated from an inductive panel of the electronic device 101. When the stylus pen 201 transmits signals via the AES scheme, the stylus pen 201 may generate a signal using a capacitive coupling with the electronic device 101. When the stylus pen 201 transmits signals via the ECR scheme, the stylus pen 201 may generate a signal having a resonance frequency based on an electric field generated from a capacitive device of the electronic device. According to an embodiment, the resonance circuit 287 may be used to vary the frequency or strength of an electromagnetic field according to the user's manipulation state. For example, the resonance circuit 287 may provide a frequency to recognize a hovering input, a drawing input, a button input, or an erasing input.

When connected with the resonance circuit 287 based on a switching circuit, the charging circuit 288 may rectify a resonance signal generated from the resonance circuit 287 into a direct current (DC) signal and provide the DC signal to the battery 289. According to an embodiment, the stylus pen 201 may identify whether the stylus pen 201 is inserted into the electronic device 101 using a voltage level of a DC signal sensed by the charging circuit 288.

The battery 289 may be configured to store power required to operate the stylus pen 201. The battery 289 may include, e.g., a lithium-ion battery or a capacitor and may be recharged or replaced. According to an embodiment, the battery 289 may be charged with power (e.g., a DC signal (e.g., DC power)) received from the charging circuit 288.

The communication circuit 290 may be configured to perform wireless communication between the stylus pen 201 and the communication module 190 of the electronic device 101. According to an embodiment, the communication circuit 290 may transmit input information and state information about the stylus pen 201 to the electronic device 101 using a short-range communication scheme. For example, the communication circuit 290 may transmit direction information (e.g., motion sensor data) about the stylus pen 201 obtained through the trigger circuit 298, voice information entered through a microphone, or remaining power information about the battery 289 to the electronic device 101. For example, the short-range communication scheme may include at least one of BLE or wireless local area network (WLAN).

The antenna 297 may be used to transmit signals or power to the outside (e.g., the electronic device 101) or receive signals or power from the outside. According to an embodiment, the stylus pen 201 may include a plurality of antennas 297 and select at least one antenna 297 appropriate for the communication scheme from among the plurality of antennas. The communication circuit 290 may exchange signals or power with an external electronic device through the at least one selected antenna 297.

The trigger circuit 298 may include at least one button or sensor circuit. According to an embodiment, the processor 220 may identify the input scheme (e.g., touch or press) or kind (e.g., EMR button or BLE button) of the button of the stylus pen 201. According to an embodiment, the sensor circuit may generate an electrical signal or a data value corresponding to an internal operating state or external environmental state of the stylus pen 201. For example, the sensor circuit may include at least one of a motion sensor, a remaining battery sensor, a pressure sensor, a light sensor, a temperature sensor, a geomagnetic sensor, or a biometric sensor. According to an embodiment, the trigger circuit 298 may transmit a trigger signal to the electronic device 101 using a signal through a sensor or a button input signal.

Figure 3B:
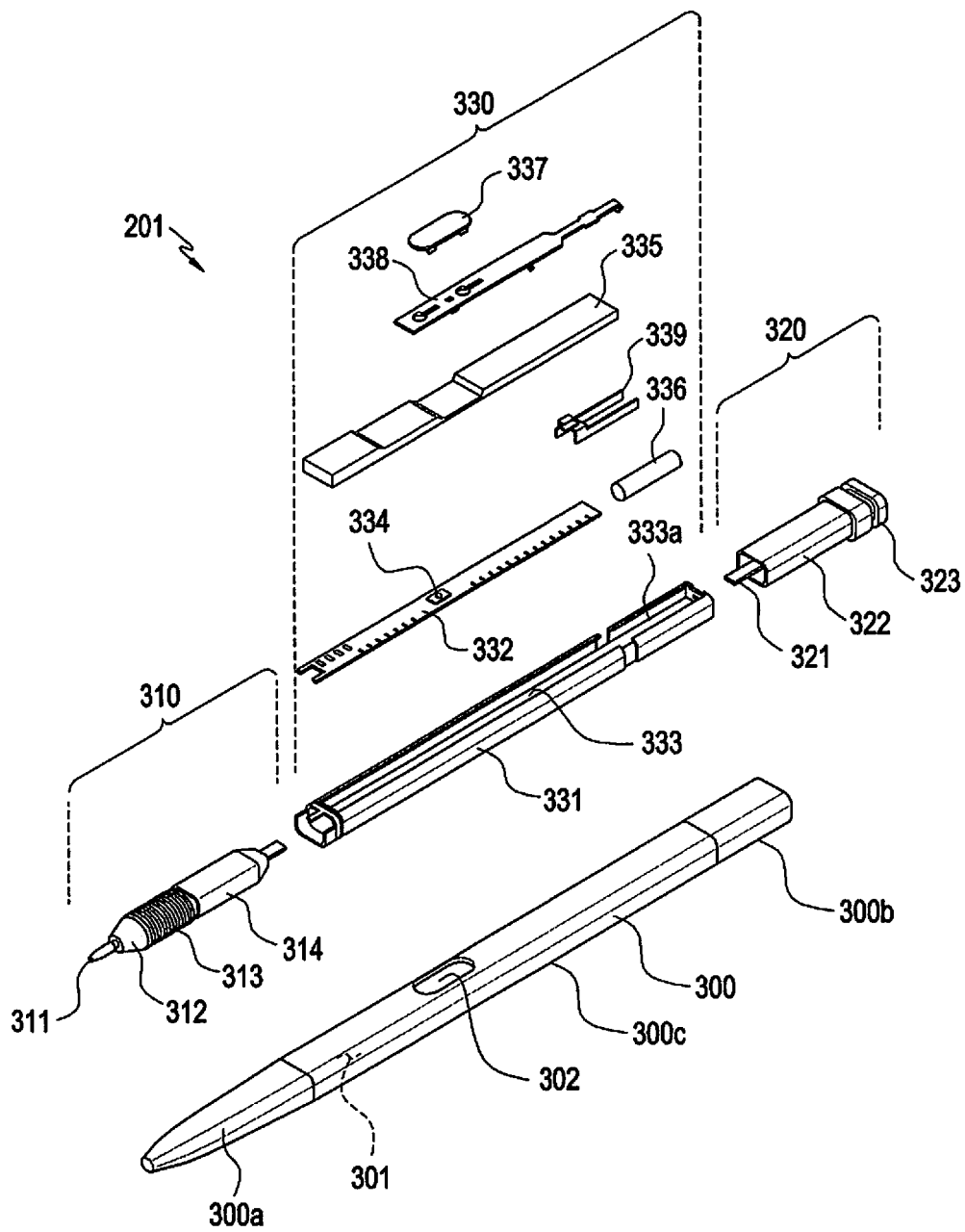
FIG. 3B is an exploded perspective view illustrating a stylus pen according to an embodiment.

FIG. 3B is an exploded perspective view illustrating a stylus pen (e.g., the stylus pen 201 of FIG. 2) according to an embodiment.

Referring to FIG. 3B, the stylus pen 201 may include a pen housing 300 forming the outer appearance of the stylus pen 201 and an inner assembly inside the pen housing 300. In the embodiment shown, the inner assembly may be inserted into the pen housing 300, with several parts mounted inside the stylus pen 201 assembled together, by a single assembly operation.

The pen housing 300 may include an elongated body 300c between a first end 300a and a second end 300b and may have a second inner space 301 inside the body 300c. The cross section of the pen housing 300 may be shaped as an ellipse with a longer axis and a shorter axis and may, overall, be shaped as an elliptical cylinder. As described above in connection with FIG. 2, the first inner space 212 of the electronic device 101 may have an elliptical cross section corresponding to the shape of the pen housing 300. According to an embodiment, the pen housing 300 may at least partially include a synthetic resin (e.g., plastic) and/or a metal (e.g., aluminum). According to an embodiment, the first end 300a of the pen housing 300 may be formed of a synthetic resin. Other various embodiments may be applied to the material of the pen housing 300.

The inner assembly may be elongated corresponding to the shape of the pen housing 300. The inner assembly may largely be divided into three components along the lengthwise direction. For example, the inner assembly may include a coil part 310 disposed in a position corresponding to the first end 300b of the pen housing 300, an ejection member 320 disposed in a position corresponding to the second end 300b of the pen housing 300, and a circuit board part 330 disposed in a position corresponding to the body of the pen housing 300.

The coil part 310 may include a pen tip 311, which is exposed to the outside of the first end 300b when the inner assembly is fully inserted into the pen housing 300, a packing ring 312, a coil 313 wound multiple times, and/or a pen pressure sensor 314 to obtain variations in pressure when the pen tip 311 is pressurized. The packing ring 312 may include epoxy, rubber, urethane, or silicone. The packing ring 312 may be provided for waterproof or dustproof purposes and protect the coil part 310 and the circuit board part 330 from water or dust. According to an embodiment, the coil 313 may form a resonance frequency within a preset frequency band (e.g., 500 kHz) and may be combined with at least one device (e.g., a capacitor) to adjust the resonance frequency produced by the coil 313 within a predetermined range.

The ejection member 320 may include a configuration to pull the stylus pen 201 out of the first inner space 212 of the electronic device (e.g., 101 of FIG. 2). According to an embodiment, the ejection member 320 may include a shaft 321, an ejection body 322 disposed around the shaft 321 to form the overall outer appearance of the ejection member 320, and a button part 323 (e.g., the first button 201a of FIG. 2). When the inner assembly is fully inserted into the pen housing 300, the portion including the shaft 321 and the ejection body 322 may be surrounded by the second end 300b of the pen housing 300, and at least part of the button part 323 may be exposed to the outside of the second end 300b. A plurality of parts, e.g., cam members or elastic members, may be disposed in the ejection body 322 to form a push-pull structure. According to an embodiment, the button part 323 may substantially be coupled with the shaft 321 to linearly move back and forth along the ejection body 322. According to an embodiment, the button part 323 may include a button with a jaw to allow the user to pull out the stylus pen 201 with his or her fingernail. According to an embodiment, the stylus pen 201 may include a sensor to detect the linear motion of the shaft 321 to thereby provide another input scheme.

The circuit board part 330 may include a printed circuit board 332, a base 331 surrounding at least one surface of the printed circuit board 332, and an antenna. According to an embodiment, a board seating part 333 may be formed on top of the base 331 to allow the printed circuit board 332 to rest, and the printed circuit board 332 may be seated and fastened onto the board seating part 333. According to an embodiment, the printed circuit board 332 may include a first surface and a second surface. A variable capacitor or a switch 334, which is connected with the coil 313, may be disposed on the first surface, and a charging circuit, a battery 336, or a communication circuit may be disposed on the second surface. According to an embodiment, the first surface and the second surface of the printed circuit board 332 may denote different surfaces stacked one over another, and in other embodiments, the first surface and the second surface may indicate different portions of the printed circuit board which are disposed along the lengthwise direction of the printed circuit board 332. The battery 336 may include an electric double layered capacitor (EDLC). The charging circuit may be positioned between the coil 313 and the battery 336 and may include a voltage detector circuit and a rectifier. In this case, the battery 336 may not necessarily be disposed on the second surface of the printed circuit board 332. The position of the battery 336 may be set to various ones depending on various mounting structures of the circuit board 330 and may be different from the position shown in the accompanying drawings.

The antenna may include an antenna structure 339 as shown in FIG. 3B and/or an antenna embedded in the printed circuit board 332. According to an embodiment, a switch 334 may be provided on the printed circuit board 332. A second button 337 provided to the stylus pen 201 may be used to push the switch 334 and may be exposed to the outside through a side opening 302 of the pen housing 300. The second button 337 may be supported by the supporting member 338 and, if no external force is applied to the second button 337, the supporting member 338 may provide an elastic restoration force to allow the second button 337 to remain or go back to a predetermined position.

The circuit board part 330 may include a packing ring such as an O-ring. According to an embodiment, O-rings may be disposed at both ends of the base 331, thereby forming a sealing structure between the base 331 and the pen housing 300. According to an embodiment, the supporting member 338 may partially come in tight contact with the inner wall of the pen housing 300 around the side opening 302, thereby forming a sealing structure. For example, at least part of the circuit board part 330 may also include a waterproof, dustproof structure similar to the packing ring 312 of the coil part 310.

The stylus pen 201 may include a battery seating part 333a on the top surface of the base 331 to allow the battery 336 to sit thereon. The battery 336 mountable on the battery seating part 333a may include, e.g., a cylinder-type battery.

The stylus pen 201 may include a microphone and/or speaker. The microphone and/or speaker may be connected directly to the printed circuit board 332 or to a separate flexible printed circuit board (FPCB) connected with the printed circuit board 332. According to an embodiment, the microphone and/or speaker may be disposed in a position parallel with the second button 337 along the longer direction of the stylus pen 301.

Figure 4:
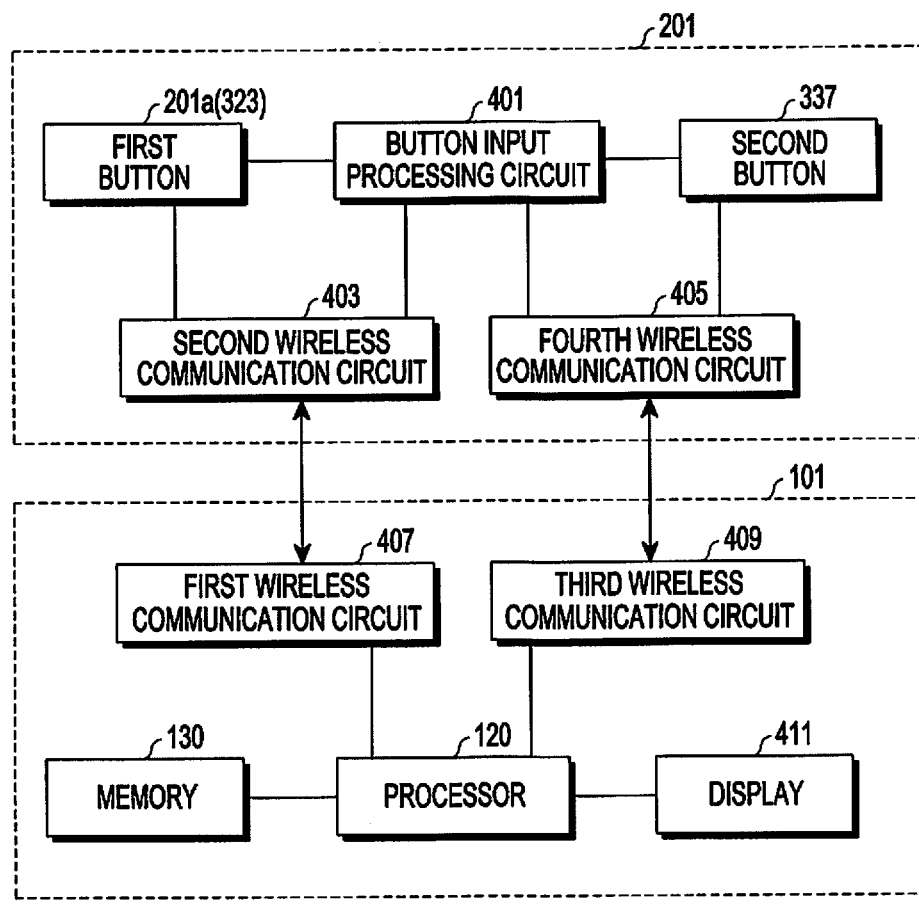
FIG. 4 is a block diagram illustrating a method of operation between an electronic device and a stylus pen according to an embodiment.
Figure 5:
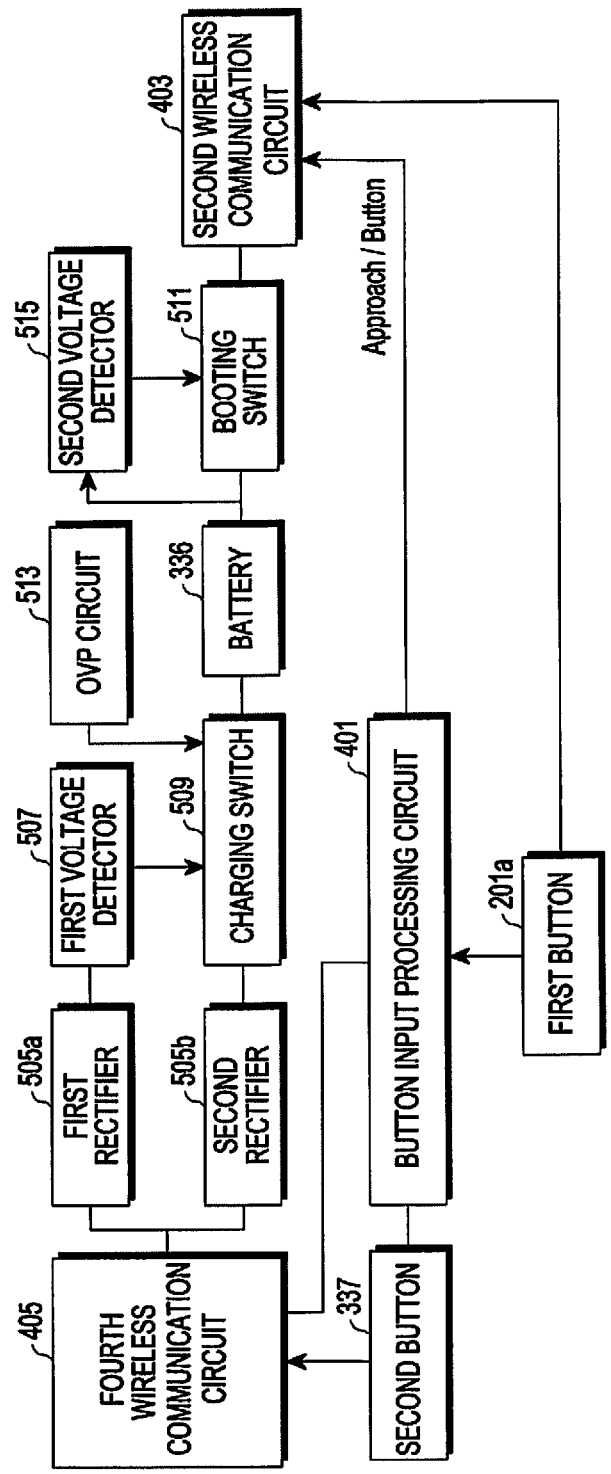
FIG. 5 is a block diagram illustrating components of a stylus pen according to an embodiment.

FIG. 4 is a block diagram illustrating a method of operation between an electronic device 101 and a stylus pen 201 (e.g., the electronic device 102 of FIG. 1). FIG. 5 is a block diagram illustrating components of a stylus pen 201 according to an embodiment.

Referring to FIGS. 4 and 5, according to an embodiment, the stylus pen 201 may include a first button 201a (e.g., the button part 323 of FIG. 3B), a second button 337, a button input processing circuit 401, a second wireless communication circuit 403, a fourth wireless communication circuit 405 (e.g., the resonance circuit 287 of FIG. 2), a first rectifier 505a, a second rectifier 505b, a first voltage detector 507 (e.g., the charging circuit 288 of FIG. 3A), a charging switch 509, a battery 336 (e.g., the battery 289 of FIG. 3A), a booting switch 511, a second wireless communication circuit 403 (e.g., the communication circuit 290 of FIG. 3A), an overvoltage protection (OVP) circuit 513, and a second voltage detector 515. The stylus pen 201 may exclude some of the above-described components or add more components.

According to an embodiment, the first button 201a may be disposed at one end of the housing (e.g., 300 of FIG. 3B) of the stylus pen 201. In the stylus pen 201 according to an embodiment, when the stylus pen 201 is in a first inner space (e.g., the first inner space 212 of FIG. 2) of the housing (e.g., the housing 210 of FIG. 2) of an electronic device 101, and the first button 201a is pushed by the user, its associated repulsive mechanisms are operated to allow the stylus pen 201 to eject from the first inner space 212. According to an embodiment, the first button 201a may include at least one switch. According to an embodiment, the stylus pen 201 may transfer a first button input signal (e.g., an electrical signal indicating that the first button 201a has been pushed) produced as the first button 201a is pushed by the user so that its adjacent capacitor and resistor are grounded to the button input processing circuit 401 or the second wireless communication circuit 403. According to an embodiment, the first button input signal may be produced by the pushing of the first button 201a regardless of whether the stylus pen 201 is in the first inner space (e.g., the first inner space 212 of FIG. 2). The above-described pushing of the first button 201a by the user may include at least one of mechanical pushing in the upper and lower directions, in the left and right directions, or a touch but without being limited thereto.

According to an embodiment, the second button 337 may be disposed on a side surface of the housing (e.g., the housing 300 of FIG. 3B) of the stylus pen 201.

Referring to FIG. 5, according to an embodiment, the second button 337 may include at least one switch. According to an embodiment, the stylus pen 201 may transfer a second button input signal (e.g., an electrical signal indicating that the second button 337 has been pushed) produced as the second button 337 is pushed by the user to the button input processing circuit 401 or the fourth wireless communication circuit 405. The above-described pushing of the second button 337 by the user may include at least one of mechanical pushing in the upper and lower directions, in the left and right directions, or a touch but without being limited thereto. According to an embodiment, as the second button 337 is pushed by the user, the capacitance of the variable capacitor circuit included in the fourth wireless communication circuit 405 may be varied.

According to an embodiment, the button input processing circuit 401 may include at least one resistor, at least one transistor, and at least one capacitor. However, this is merely an example, and the button input processing circuit 401 may be configured in other various forms which may implement various operations described below. For example, the button input processing circuit 401 may be implemented as a processor (e.g., the processor 220 of FIG. 3A). In this case, the button input processing circuit 401 may include, as a hardware module or a software module (e.g., an application program), a hardware component (e.g., a function) or a software element (e.g., a program) including at least one of a communication module or a module to manage the state or environment of the stylus pen 201, an input/output interface, a data measuring module, and various sensors provided in the stylus pen 201.

According to an embodiment, the button input processing circuit 401 may receive the first button input signal from the first button 201a or the second button input signal from the second button 337. According to an embodiment, the button input processing circuit 401, upon receiving an electrical signal (e.g., the second button input signal) from the second button 337, may determine whether to transfer a control signal (e.g., a button of FIG. 5) corresponding to the second button input signal to the second wireless communication circuit 403. For example, the determination of whether to transfer the second button input signal to the second wireless communication circuit 403 may be made by performing a computation based on at least one of the first button input signal received from the first button 201a or a proximity signal received from the fourth wireless communication circuit 405. The proximity signal may indicate at least one of, e.g., an electromagnetic signal applied to the fourth wireless communication circuit 405, a current output from the fourth wireless communication circuit 405 by an electromagnetic signal, or a current output from the first voltage detector (e.g., 507 of FIG. 5). For example, according to an embodiment, the button input processing circuit 401 may refrain from transmitting the control signal corresponding to the second button input signal to the second wireless communication circuit 403 while the first button input signal is received.

According to an embodiment, the button input processing circuit 401 may receive the proximity signal from the fourth wireless communication circuit 405 when the stylus pen 201 is positioned within a proximate range (e.g., 10 cm) from the electronic device 101. According to an embodiment, the button input processing circuit 401 may determine whether to transfer the second button input signal to the second wireless communication circuit 403 based on the received proximity signal. According to an embodiment, the button input processing circuit 401 may transfer a control signal (e.g., an approach of FIG. 5) corresponding to the received proximity signal to the second wireless communication circuit 403. In this case, the second wireless communication circuit 403 may not transmit, to the electronic device 101, a signal (e.g., a fourth signal) responsive to the second button input signal from the button input processing circuit 401 while the control signal (e.g., the approach of FIG. 5) is continuously received. The above-described determination of whether to transfer the second button input signal to the second wireless communication circuit 403 based on the control signal (e.g., the approach of FIG. 5) may be implemented by various techniques.

According to an embodiment, the second wireless communication circuit 403 may be a communication circuit configured to transmit and/or receive signals to/from the first wireless communication circuit 407 by a Bluetooth scheme (or BLE). Besides, for example, signal transmission and/or reception between the first wireless communication circuit 407 and the second wireless communication circuit 403 may be implemented using at least one of wireless-fidelity (Wi-Fi), Wi-Fi direct, or near-field communication (NFC).

According to an embodiment, upon receiving the first button input signal from the first button 201a, the second wireless communication circuit 403 may transmit a BLE signal (e.g., the first signal or the second signal) to the first wireless communication circuit 407 of the electronic device 101. According to an embodiment, the first signal may indicate a signal transmitted to the first wireless communication circuit 407 in response to the pushing of the first button 201a by the user while the stylus pen 201 is positioned inside the housing 210 of the electronic device 101. According to an embodiment, the first signal may include charging information indicating that the stylus pen 201 is being charged by the electronic device 101. According to an embodiment, the second signal may indicate a signal transmitted to the first wireless communication circuit 407 in response to the pushing of the first button 201a by the user while the stylus pen 201 is positioned outside the housing 210 of the electronic device 101 (e.g., the stylus pen 201 is in the state of not being inserted in the housing 210). According to an embodiment, the second signal may include a command for executing or performing a specific function (e.g., an application or a task) on the electronic device 101.

According to an embodiment, when the first button 201a is pushed by the user, if an electrical signal (e.g., the first button input signal) produced as the switch constituting the first button 201a is turned on or off is transferred to the button input processing circuit 401 or the second wireless communication circuit 403, the signal transmitted by the second wireless communication circuit 403 to the first wireless communication circuit 407 in response to the signal transfer may be referred to as a first button pushing signal. The first button pushing signal may be transmitted separately from the first signal or the second signal or along with the first signal or second signal, with the first button pushing signal included in the first signal or second signal.

According to an embodiment, the second wireless communication circuit 403 may receive a control signal (e.g., the button of FIG. 5) corresponding to the second button input signal from the button input processing circuit 401. According to an embodiment, upon receiving the control signal corresponding to the second button input signal, the second wireless communication circuit 403 may transmit a fourth signal to the first wireless communication circuit 407 of the electronic device 101. According to an embodiment, the fourth signal may indicate a signal transmitted to the first wireless communication circuit 407 in response to the pushing of the second button 337 by the user while the stylus pen 201 is positioned outside the housing 210 of the electronic device 101 (e.g., the stylus pen 201 is in the state of not being inserted in the housing 210). According to an embodiment, the second wireless communication circuit 403 may not transmit the fourth signal when the stylus pen 201 is positioned within a proximate range (e.g., 10 cm) from the display 411 of the electronic device 101 (e.g., when the stylus pen 201 receives a proximity signal). In this case, the stylus pen 201 may perform signal transmission and/or reception with the electronic device 101 by way of an EMR communication scheme using the fourth wireless communication circuit 405.

According to an embodiment, the second wireless communication circuit 403 or the processor (e.g., the processor 220 of FIG. 3A) may not transmit a BLE signal (e.g., the fourth signal) to the electronic device 101 despite receiving a control signal (e.g., the button of FIG. 5) corresponding to the second button input signal while the first button input signal is received from the first button 201a (e.g., while short circuited or shorted) by the pushing of the first button 201a. In this case, the second button 337 may operate as a button for EMR communication.

Figure 20:
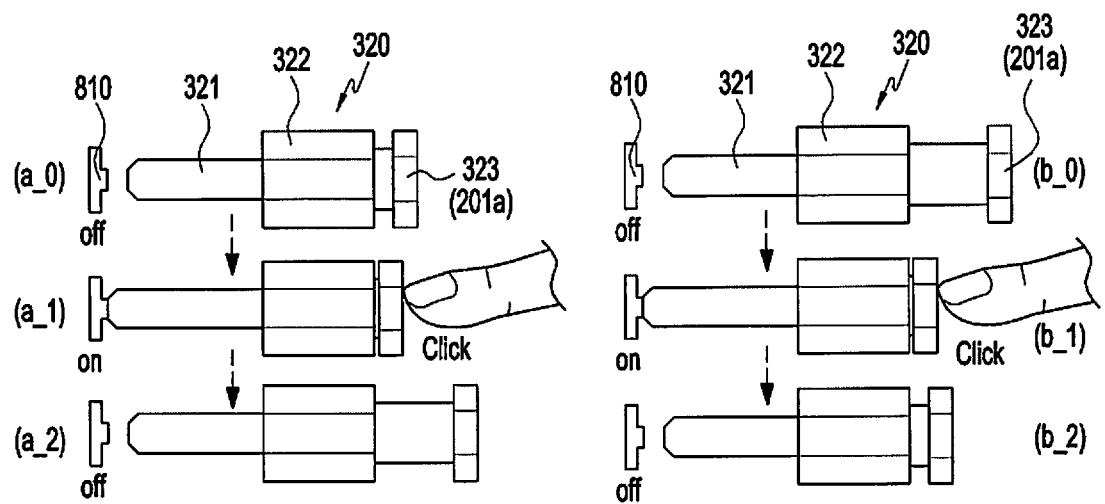
FIG. 20 is a view illustrating an input signal being produced as a user pushes a first button.

According to an embodiment, the second wireless communication circuit 403 or the processor (e.g., the processor 220 of FIG. 3A), in a case where the first button 201a is implemented as shown in FIG. 20, may change the identifier (e.g., the flag value) from 1 to 0 or from 0 to 1 whenever the first button input signal is received (e.g., whenever an electrical signal produced by the pushing of the first button 201a is received). According to an embodiment, the flag value may be set to 1 when the stylus pen 201 is removed (e.g., popped-up) from the electronic device 101 by the first button 201a (e.g., when the stylus pen 201 stops charging) and, then, whenever the first button input signal is received, the flag value may be changed from 1 to 0 or from 0 to 1. In this case, the second button 337 may operate as a button for BLE communication or EMR communication based on the flag value.

According to an embodiment, the fourth wireless communication circuit 405 may be a communication circuit configured to transmit and/or receive signals to/from the third wireless communication circuit 409 in an EMR scheme. According to an embodiment, as shown in FIG. 5, the fourth wireless communication circuit 405 may be an EMR communication circuit and may include an EMR coil (e.g., the coil 313 of FIG. 3B, e.g., an inductor) and a variable capacitor circuit or element capable of producing electromagnetic fields and may include at least one element (e.g., a resistor (R), a capacitor (C), and/or an inductor (L)) for varying the strength or frequency of an electromagnetic field depending on the user's manipulation.

Referring back to FIG. 4, according to an embodiment, the first wireless communication circuit 407, when the second button 337 is pushed by the user, may vary the capacitance of the variable capacitor circuit, thereby changing the frequency of electromagnetic signal produced by the EMR coil (e.g., the coil 313 of FIG. 3B). According to an embodiment, the fourth wireless communication circuit 405 may transmit a third signal corresponding to the frequency-changed electromagnetic signal to the third wireless communication circuit 409.

According to an embodiment, the fourth wireless communication circuit 405 may receive a proximity signal from the third wireless communication circuit 409 in an EMR scheme. According to an embodiment, the proximity signal may indicate an electromagnetic signal produced from the third wireless communication circuit 409 positioned inside the housing 210 of the electronic device 101 when the stylus pen 201 is positioned within a predesignated proximate range from the display 411 of the electronic device 101 and transferred to the fourth wireless communication circuit 405. According to an embodiment, the reception of the proximity signal from the third wireless communication circuit 409 by the stylus pen 201 may be performed in such a manner that a current is induced and produced at the EMR coil (e.g., the coil 313 of FIG. 3B) by an electromagnetic wave produced from the detection coil included in the third wireless communication circuit 409. According to an embodiment, the fourth wireless communication circuit 405 may transfer the received proximity signal to the first voltage detector 507 or the button input processing circuit 401. According to an embodiment, the fourth wireless communication circuit 405 may receive the proximity signal and, in response to the received proximity signal, transmit a first response signal to the third wireless communication circuit 409.

According to an embodiment, the fourth wireless communication circuit 405 may receive a charging signal (or charging power) from a first charging coil included in the electronic device 101. The first charging coil may be disposed around the first inner space (e.g., the first inner space 212 of FIG. 2). According to an embodiment, the charging signal may indicate an electromagnetic signal produced from the first charging coil when the stylus pen 201 is positioned inside the first inner space of the electronic device 101 and transferred to the fourth wireless communication circuit 405. According to an embodiment, the stylus pen 201 may further include a second charging circuit separate from the fourth wireless communication circuit 405 to receive a charging signal from the first charging coil. According to an embodiment, the reception of charging signal from the first charging coil by the stylus pen 201 may be performed in such a manner that a current is induced and produced at the EMR coil (e.g., the coil 313 of FIG. 3B or the second charging circuit from the first charging coil by an electromagnetic induction scheme.

According to an embodiment, the resonance circuit may have a resonance frequency of about 500 KHz band by the EMR coil (e.g., the coil 313 of FIG. 3B) and the capacitor circuit. According to an embodiment, the fourth wireless communication circuit 405 may form at least two resonance frequencies (e.g., 530 KHz and 560 KHz bands). According to an embodiment, in the first wireless communication circuit 407, the capacitance of the variable capacitor circuit may be varied by the second button 337 which is turned on or off by the user's push of the second button 337. As the capacitance of the variable capacitor circuit is varied, the resonance frequency of the fourth wireless communication circuit 405 may be varied as well. For example, a drawing action by the stylus pen 201 or a button action (e.g., an input action by pushing the second button 337) may be differentiated by the at least two resonance frequencies.

According to an embodiment, the first rectifier 505a may include at least one diode. According to an embodiment, the first rectifier 505a may rectify alternating current (AC) power (e.g., a proximity signal) received from the electronic device (e.g., the electronic device 101 of FIG. 1) and output from the fourth wireless communication circuit 405 into DC power and transfer the DC power to the first voltage detector 507.

According to an embodiment, the second rectifier 505b may include at least one diode. According to an embodiment, the second rectifier 505b may rectify AC power (e.g., a charging signal) received from the electronic device (e.g., the electronic device 101 of FIG. 1) and output from the fourth wireless communication circuit 405 into DC power and transfer the DC power to the charging switch 509.

According to an embodiment, the first voltage detector 507 may detect the value of the voltage applied to the first voltage detector 507. According to an embodiment, the first voltage detector 507 may detect whether the magnitude of the detected voltage belongs to a designated range based on the magnitude of the detected voltage value. According to an embodiment, the designated range may be divided into a range, e.g., from 1.5V to 3.5V (e.g., level 1 range) or a range not less than 3.5V (e.g., level 2 range) but this is merely an example. For example, when the magnitude of the detected voltage falls within the level 2 range, the stylus pen 201 may be in the state of being inside the first inner space (e.g., the first inner space 212 of FIG. 2) of the electronic device (e.g., the electronic device 101 of FIG. 1) and, when the magnitude of the detected voltage falls within the level 1 range, the stylus pen 201 may be in the state of being used (e.g., touching) over the display (e.g., the display 411 of FIG. 4) of the electronic device 101 (e.g., the state of being positioned within a predesignated proximate range from the display 411). Unless the magnitude of the detected voltage falls within the level 1 range or the level 2 range (e.g., less than 1.5V), the stylus pen 201 may be in the state of being out of the predesignated proximate range from the display 411. According to an embodiment, when the magnitude of the detected voltage belongs to the level 2 range, the first voltage detector 507 may apply an enable signal to the charging switch 509 to turn on the charging switch 509 to allow the DC power transmitted from the rectifier 505 to be applied to the battery 336. According to an embodiment, when the magnitude of the detected voltage belongs to the level 1 range, the first voltage detector 507 may control the charging switch 509 to turn, or remain, off.

According to an embodiment, the second voltage detector 515 may detect the voltage value of the power output from the battery 336. According to an embodiment, the booting switch 511 may be shorted based on the magnitude of the voltage value detected by the second voltage detector 515. In this case, the second wireless communication circuit 403 may be booted up. As used herein, "booting" may indicate cold booting which is performed when the voltage value detected by the second voltage detector 515 is not less than a designated value (e.g., 2.4V).

According to an embodiment, the OVP circuit 513 may detect the strength of the voltage applied to the battery 336 and limit application of a voltage not less than a predesignated strength (e.g., 2.6V) to the battery 336.

Referring back to FIG. 4, according to an embodiment, the electronic device 101 may include the first wireless communication circuit 407 (e.g., the wireless communication module 192 of FIG. 1), the third wireless communication circuit 409, the memory 130, the processor 120, and the display 411.

According to an embodiment, the first wireless communication circuit 407 may be a communication circuit configured to transmit and/or receive signals to/from the second wireless communication circuit 403 by a Bluetooth scheme (or BLE). Besides, signal transmission and/or reception between the first wireless communication circuit 407 and the second wireless communication circuit 403 may be implemented using at least one of Wi-Fi, Wi-Fi direct, or NFC.

According to an embodiment, the first wireless communication circuit 407 may receive a first signal transmitted from the second wireless communication circuit 403 as the first button 201a is pushed. In this case, the stylus pen 201 positioned inside the housing 210 of the electronic device 101 and charged by the electronic device 101 may be in the state of being removed from the inside of the housing 210 by the pushing of the first button 201a. According to an embodiment, the first wireless communication circuit 407 may receive a second signal from the second wireless communication circuit 403 as the first button 201a is pushed. In this case, the stylus pen 201 may be in the state of being positioned outside the housing 210 of the electronic device 101.

According to an embodiment, the first wireless communication circuit 407 may receive a fourth signal transmitted from the second wireless communication circuit 403 as the second button 337 is pushed. In this case, the stylus pen 201 may be in the state of being positioned out of a proximate range (e.g., 10 cm) from the display 411 (e.g., in the state of the third wireless communication circuit 409 failing to receive the first response signal from the fourth wireless communication circuit 405). According to an embodiment, the first wireless communication circuit 407 may fail to receive the fourth signal from the second wireless communication circuit 403 when the stylus pen 201 is in the state of being positioned within the proximate range (e.g., 10 cm) from the display 411.

According to an embodiment, the third wireless communication circuit 409 may be a communication circuit configured to transmit and/or receive signals to/from the fourth wireless communication circuit 405 in an EMR scheme. According to an embodiment, the third wireless communication circuit 409 may be positioned under the display 411 of the electronic device 101 and may include a detection coil. According to an embodiment, the third wireless communication circuit 409 may transmit and/or receive signals to/from the EMR coil (e.g., the coil 313 of FIG. 3B) of the fourth wireless communication circuit 405 using the detection coil in an electromagnetic induction scheme.

According to an embodiment, the third wireless communication circuit 409 may transmit a proximity signal to the fourth wireless communication circuit 405 in an EMR scheme. According to an embodiment, the third wireless communication circuit 409 may receive the first response signal from the fourth wireless communication circuit 405 in response to the transmission of the proximity signal.

According to an embodiment, the memory 130 may store instructions to set control operations of the processor 120.

According to an embodiment, the processor 120 may control operations for a user interface via wireless communication with the stylus pen 201. According to an embodiment, the processor 120 may perform processing corresponding to a BLE signal (e.g., the first signal, the second signal, or the fourth signal) received from the stylus pen 201 using the first wireless communication circuit 407 and an EMR signal (e.g., the third signal) received from the stylus pen 201 using the third wireless communication circuit 409. According to an embodiment, the processor 120 may determine whether to perform the processing corresponding to the received EMR signal or the received BLE signal (e.g., whether to perform a preset or predesignated task (e.g., executing an air command application)) based on at least one of the state or count of pushing of the first button 201a, whether the stylus pen 201 is inserted (or whether the stylus pen 201 is being charged), the distance between the stylus pen 201 and the display 411, or a signal processing setting as per the user's input.

According to an embodiment, the display 411 (e.g., the display device 160 of FIG. 1) may include an electromagnetic induction panel. According to an embodiment, the electromagnetic induction panel may be an EMR-type touch panel and may include an electronic induction coil sensor having a grid structure in which a plurality of loop coils (e.g., detection coils) are arranged in a predetermined first direction and in a second direction crossing the first direction and an electronic signal processor for sequentially providing AC signals of a predetermined frequency to the loop coils (e.g., detection coils) of the electronic induction coil sensor. When the stylus pen 201 including a resonance circuit (e.g., the coil 313 of FIG. 3B) is present near a loop coil of the electromagnetic induction panel, the magnetic field (e.g., an electromagnetic field) transmitted form the loop coil may produce a current at the resonance circuit (e.g., the fourth wireless communication circuit 405) in the stylus pen 201 based on mutual induction. When an induced magnetic field is produced from the coil (e.g., the coil 313 of FIG. 3B) constituting the resonance circuit (e.g., the fourth wireless communication circuit 405) in the stylus pen 201 by the current, the electromagnetic induction panel may detect the induced magnetic field from the loop coil (e.g., a detection coil) which is in the state of receiving a signal, thereby detecting the position of hovering or touch and/or the height (or distance) from the electronic device 101 to the electronic device 201.

Figure 6:
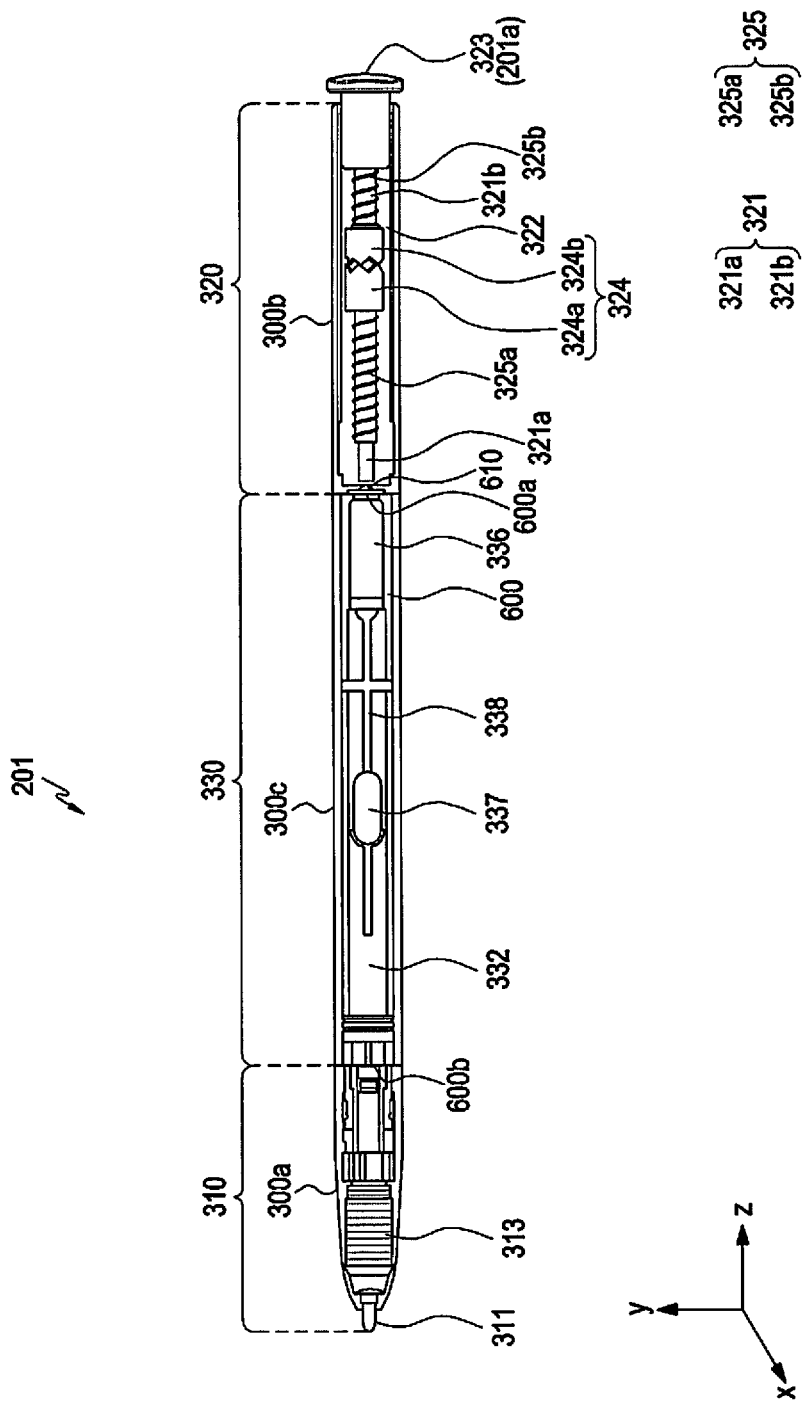
FIG. 6 is a view illustrating an internal structure of a stylus pen according to an embodiment.

FIG. 6 is a view illustrating an internal structure of the stylus pen 201 according to an embodiment.

Referring to FIG. 6, according to an embodiment, the stylus pen 201 may further include an internal structure 600. The internal structure 600 may be disposed in the second inner space (e.g., 301 of FIG. 3B) formed in the body 300c of the pen housing 300.

According to an embodiment, the internal structure 600 may be a portion surrounding at least part of the internal assembly. According to an embodiment, the internal structure 600 may be a portion provided additionally or alternatively to the base (e.g., 331 of FIG. 3B). According to an embodiment, the internal structure 600 may be a portion surrounding the circuit board part 330 including the base (e.g., 331 of FIG. 3B). Alternatively, the internal structure 600 may be a portion surrounding the circuit board part 330 replacing the base (e.g., 331 of FIG. 3B).

The internal structure 600 may form a space (e.g., the third inner space (e.g., 801 of FIG. 8 described below)) for receiving at least part of the circuit board part 330. According to an embodiment, the internal structure 600 may be formed in a hollow tube shape by injection molding to surround a majority of the circuit board part 330 along the lengthwise direction of the circuit board part 330. According to an embodiment, the internal structure 600 may be formed to be pulled in or out of the internal structure 600 while at least part of the ejection member 320 or coil part 310, as well as the circuit board part 330, linearly moves back and forth.

The printed circuit board 332 included in the circuit board part 330 may be received in the third inner space (e.g., 801 of FIG. 8 described below). As the printed circuit board 332 is received in the third inner space (e.g., 801 of FIG. 8 described below), the charging circuit and communication circuit may be safely protected against external impacts. According to an embodiment, an antenna or the battery 336 may be received in the third inner space (e.g., 801 of FIG. 8 described below). The second button 337 and a supporting member 338 may be formed on one side surface of the internal structure 600. According to an embodiment, the second button 337 and the supporting member 338 may be, at least partially, exposed from the internal structure 600. In addition, various parts included in the circuit board part 330 may be received in the third inner space (e.g., 801 of FIG. 8 described below).

The third inner space (e.g., 801 of FIG. 8 described below) may be formed elongated in the same direction as the second inner space 301. Since the third inner space (e.g., 801 of FIG. 8 described below) is positioned in the second inner space 301, the size of the space may be smaller than the second inner space 301.

The internal structure 600 may be inserted through one side (e.g., the second end 300b) of the second inner space 301 formed in the pen housing 300 and be withdrawn through the one side (e.g., the second end 300b) of the second inner space 301. After the internal structure 600 is inserted and assembled into the pen housing 300, the internal structure 600 may be sealed off to prevent water from permeating from a gap of the pen housing 300 to the internal structure 600.

According to an embodiment, the internal structure 600 may have a sealed structure. For example, an O-ring may be mounted on at least one side of the internal structure 600. The O-ring may have a similar shape to the packing ring 312 described above in connection with FIG. 3, but is not limited thereto. According to an embodiment, at least one or more waterproof structures may be formed on the outer circumference of the internal structure 600. The waterproof structures are described below in detail with reference to FIG. 8.

The internal structure 600 may include a third end 600a facing the second end 300b of the stylus pen 201 and a fourth end 600b positioned away from the third end 600a. The third end 600a may face the ejection member 320 of the inner assembly. According to an embodiment, the third end 600a may contact a portion of the ejection member 320. The fourth end 600b may face the coil part 310 of the internal structure, and the fourth end 600b may contact a portion of the coil part 310.

A pushable switch structure 610 may be formed at the third end 600a of the internal structure 600. According to an embodiment, the third end 600a of the internal structure 600 may have a flat surface towards the ejection member 320, and the switch structure 610 may be disposed on the flat surface.

The switch structure 610 may be configured in a modular form which includes at least one switch (e.g., 811 of FIG. 8 described below) and a switch board (e.g., a switch board 812 (e.g., an FPCB) on which the switch is mounted. The switch may be installed on the flat surface of the third end 600a to contact a portion of the ejection member 320, and the switch board (e.g., 812) on which the switch is mounted may be formed over at least one of the surfaces forming the outer appearance of the internal structure 600.

The switch structure 610 is described below in detail with reference to FIG. 8.

The ejection member 320 may be assembled in such a manner that the ejection body 322 is inserted into the pen housing 300 (e.g., the second end 300b) and fastened in a certain position inside the pen housing 300.

As the ejection member 320 is assembled into the pen housing 300, the shaft 321 may be positioned between the switch structure 610 and the first button 201a and play a role to transfer a physical force exerted to the first button 201a when the user pushes the first button 201a to the switch structure 610. When the switch structure 610 is pushed by the shaft 321, the switch structure 610 may convert the pushing by the shaft 321 into an electrical signal.

The shaft 321 may extend from the third end 600a of the internal structure 600 towards the second end 300b of the pen housing 300 along the axis of a first direction. The shaft 321 may be connected with the first button 201a and be configured to linearly move back and forth in the first direction depending on pushing of the first button 201a. A portion of the shaft 321 may project from one end of the ejection body 322, and the shaft 321 may be installed to linearly move back and forth inside the ejection body 322 along the direction of extension of the ejection body 322.

A plurality of mechanical parts may be further included in the ejection body 322. Any one of the mechanical parts may be a cam member 324. According to an embodiment, two shafts 321 may be provided; one referred to as a first shaft 321a and the other as a second shaft 321b. The first shaft 321a may be disposed adjacent to the third end 600a of the internal structure 600 with respect to the cam member 324, and the second shaft 321b may be disposed adjacent the first button 201a with respect to the cam member 324.

According to an embodiment, a plurality of, e.g., two, cam members 324a and 324b may be disposed inside the ejection body 322. At least one elastic member 325 may be disposed inside the ejection body 322. The at least one elastic member 325 may be wound on the outer circumference of the shaft 321, and one end and the other thereof may be supported inside the ejection body 322. The elastic member 325 may be formed to expand or contract as the shaft 321 moves.

According to an embodiment, at least two or more cam members 324a and 324b may be combined with elastic members 325a and 325b for supporting at least one side of the cam members, forming a click mechanism of the stylus pen 201. The cam members 324a and 324b and the elastic members 325a and 325b may be disposed inside the ejection body 322, and the deformation of the elastic members and the mutual engagement of the cam members and their restoring may alternately be performed as the first button 201a is pushed.

Figure 7:
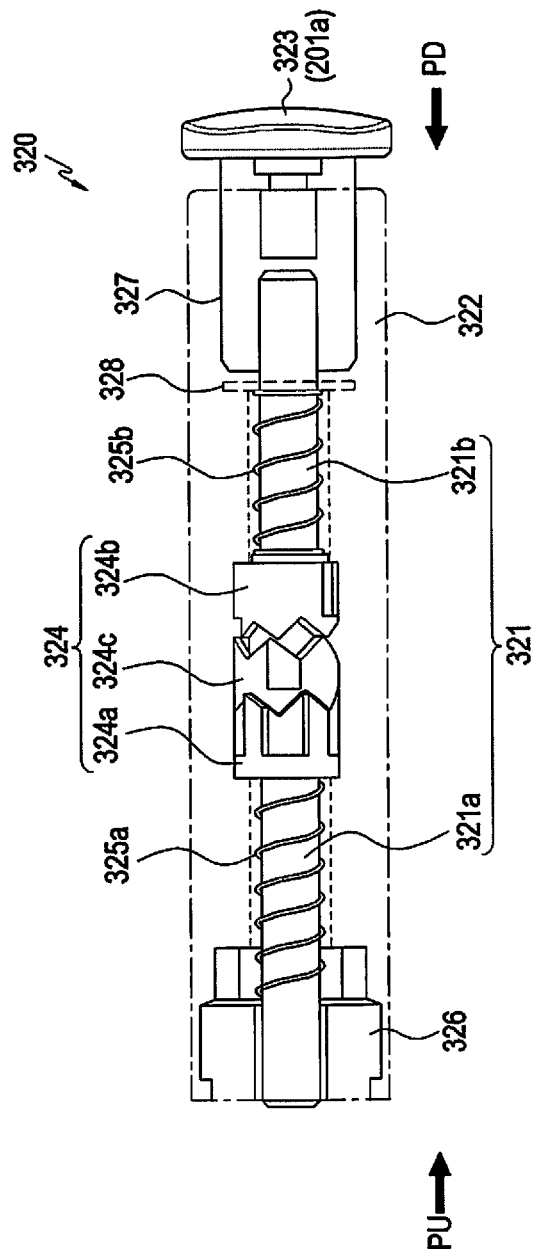
FIG. 7 is a view illustrating an internal structure of an ejection member according to an embodiment.

FIG. 7 is a view illustrating an internal structure of the ejection member 320 according to an embodiment.

Referring to FIG. 7, according to an embodiment, the shaft 321 and the first button 201a may be disposed to be able to linearly move back and forth inside the ejection body 322. The first button 201a may receive an elastic force (e.g., a restorative force) in the direction of projecting the first button 201a from one end of the ejection body 322 to the outside (hereinafter, a pop-up direction PU). For example, by including the first elastic member 325a, the ejection member 320 may receive a restorative force of moving the shaft 321 or the first button 201a in the pop-up direction PU.

According to an embodiment, a first supporting structure 326 may be formed inside the ejection body 322. The first elastic member 325a may be supported by the first supporting structure 326 to provide an elastic force to the first button 201a from one end of the ejection body 322 in the pop-up direction PU.

According to an embodiment, a connection member 327 may be provided inside the ejection body 322 to connect the shaft 321 with the first button 201a. For example, the second shaft 321b and the first button 201a may be combined with the connecting member 327 and may, thus, be linearly moved back and forth in substantially the same direction and interval. According to an embodiment, the connection member 327 may integrally extend from the first button 201a. According to an embodiment, the connection member 327 may integrally extend from the second shaft 321b.

According to an embodiment, by further including the second elastic member 325b, the stylus pen 201 may provide an elastic force in the direction of inserting, or allowing to enter, the first button 201a into the inside of the ejection body 322 (hereinafter, a pop-down direction PD). For example, a second supporting structure 328 may be formed inside the ejection body 322. The second elastic member 325b may be supported by the second supporting structure 328 to provide an elastic force in the direction of inserting or, allowing to enter, the first button 201a into the ejection body 322. According to an embodiment, even when the first button 201a is fully inserted or entered into the ejection body 322, a portion of the first button 201a may be exposed or projected to the outside of the ejection body 322. For example, with the connection member 327 fully inserted or entered into the ejection body 322, the first button 201a may form part of the outer appearance of the stylus pen 201.

According to an embodiment, a plurality of, e.g., three, cam members may be disposed inside the ejection body 322.

The stylus pen 201 may include three cam members 324a, 324b, and 324c. For example, the stylus pen 201 may include a first cam member 324a which is disposed on the shaft 321 and rotates or linearly moves back and forth along with the shaft 321, a third cam member 324c which is disposed on the shaft 321 and rotates or linearly moves back and forth with respect to the shaft 321, and/or a second cam member 324b which is mounted on the shaft 321 and linearly moves back and forth along with the shaft 321 (or the first button 201a). According to an embodiment, the second cam member 324b may be disposed to face the first cam member 324a, with the third cam member 324c disposed therebetween. For example, the first cam member 324a, the third cam member 324c, and the second cam member 324b may sequentially be arranged along the lengthwise direction of the shaft 321, and the first cam member 324a and the third cam member 324c may be rotated or linearly moved with respect to the shaft 321.

According to an embodiment, the first elastic member 325a may be supported by the first cam member 324a to provide an elastic force to the first cam member 324a. The second elastic member 325b may be supported by the second cam member 324b to provide an elastic force to the second cam member 324b. According to an embodiment, the first elastic member 325a may be positioned more inside than the second elastic member 325b, e.g., the first elastic member 325a may be positioned closer to the internal structure (e.g., the internal structure 600 of FIG. 6), to provide an elastic force to the first cam member 324a in the pop-up direction PU. The second elastic member 325b may be positioned relatively farther away from the internal structure 600, e.g., the second elastic member 325b may be positioned adjacent the first button 201a, providing an elastic force to the second cam member 324b in the pop-down direction PD.

The first cam member 324a, the third cam member 324c, and/or the second cam member 324b may be kept in tight contact with each other by the elastic forces of the first elastic member 325a and the second elastic member 325b. According to an embodiment, the elastic force of the first elastic member 325a may be greater than the elastic force of the second elastic member 325b. For example, when no external force is applied, the combined forces of the first elastic member 325a and the second elastic member 325b may be exerted in the pop-up direction PU.

According to an embodiment, each of the cam members 324a, 324b, and 324c may be rotated or linearly moved back and forth in a predetermined interval inside the ejection body 322. A guide structure surrounding the shaft 321 and the cam members 324a, 324b, and 324c may be further included in the ejection body 322. The guide structure may be a component engaged with the cam members 324a, 324b, and 324c. The cam members 324a, 324b, and 324c may be rotated or linearly moved back and forth in a predetermined interval inside the ejection body 322 depending on the state of engagement with the guide structure. The guide structure may be structured with projection guides and holes corresponding to the ridges and valleys of the cam members 324a, 324b, and 324c. The cam members 324a, 324b, and 324c and the guide structure may come in various shapes, and no further detailed description thereof is presented below. According to an embodiment, the guide structure may be integrally formed with the ejection body 322.

According to an embodiment, the first cam member 324a and the third cam member 324c may be linearly moved back and forth along with the shaft 321 in their allowed intervals and, when escaping off the intervals of linear motion, be rotated on the shaft 321 while reentering the intervals of linear motion at least partially. The second cam member 324b may be installed only to be linearly moved back and forth substantially inside the ejection body 322.

According to an embodiment, the first cam member 324a, the second cam member 324b, and/or the third cam member 324c may be engaged in various forms depending on the degree of pushing of the first button 201a. For example, unless the first button 201a is fully pushed within its movable range (e.g., pushed about in half), the first cam member 324a and the third cam member 324c may be rotated and engaged with each other, thereby producing a first click. When the first click is produced, a first feedback sound may be generated to allow the user to recognize the first click. For example, when the first button 201a is fully pushed within its movable range, the third cam member 324c may be rotated and engaged with the second cam member 324b, thereby producing a second click. When the second click is produced, a second feedback sound may be generated to allow the user to recognize the second click. The first feedback sound may differ from the second feedback sound. By so doing, the user may easily recognize the state of button input on the stylus pen 201 when unconsciously manipulating the input of button (e.g., the first button) on the stylus pen 201.

In sum, the click mechanism of the stylus pen 201 may be achieved by organic operations of the first button 201a, the cam members 324a, 324b, and 324c, the elastic members 325a and 325b, and the shaft 321. The click mechanism allows the user to perform various mechanical and physical operations on the stylus pen 201 by simply pushing the first button 201*a*. When the user pushes the first button 201*a*, the shaft 321 may be linearly moved back and forth in the first direction, and the switch structure (e.g., the switch structure 610 of FIG. 6) may produce various electrical signals as it is pushed by the pressurization of the shaft 321.

The internal structure of the stylus pen 201 for producing various electrical signals through a switch structure 810 is described below.

Figure 8:
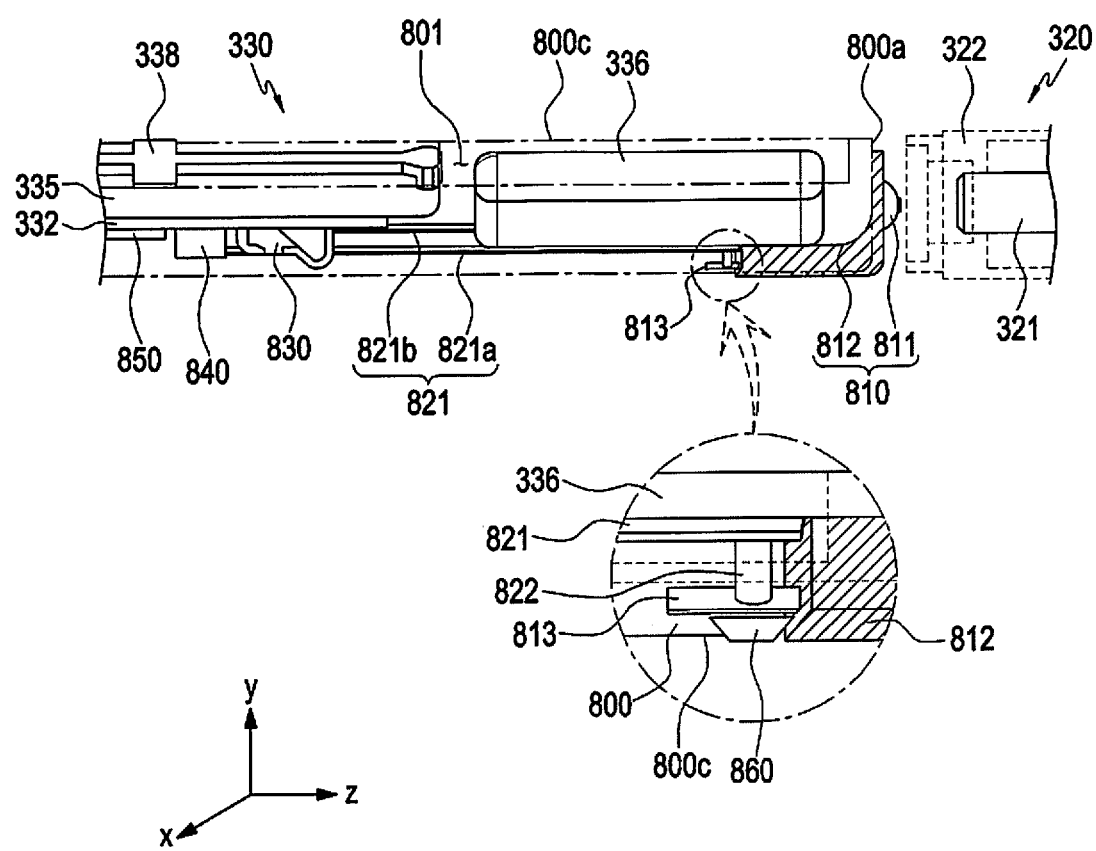
FIG. 8 is a view illustrating a cross section of a side of a stylus pen according to an embodiment.

FIG. 8 is a view illustrating a cross section of a side of a stylus pen (e.g., 201 of FIG. 6) according to an embodiment. FIG. 8 illustrates a cross section of a third end 800*a* of the stylus pen (e.g., 201 of FIG. 6) and a portion of the ejection member 320.

Referring to FIG. 8, a switch board 812 on which a switch 811 is mounted may be formed over the third end 800*a* of the internal structure 800 (e.g., the internal structure 600 of FIG. 6) and an outer side surface 800*c* of the internal structure 800 which is positioned adjacent the third end 800*a*. According to an embodiment, the switch board 812 formed on the outer side surface 800*c* of the internal structure 800 may be interposed between the internal structure 800 and the pen housing (e.g., 300 of FIG. 3B). According to an embodiment, the switch structure 810 may be installed so that at least part thereof is led in the third inner space 801 of the internal structure 800.

The switch structure 810 may be formed to be pushed by a portion of the ejection member 320. According to an embodiment, the switch structure 810 may be pushed by the linear motion of the shaft 321 (e.g., the linear motion of the shaft 321 in the first direction depending on whether the first button 201*a* is pushed) in the ejection member 320 and be configured to convert the pushing by the shaft 321 into an electrical signal. For example, the switch structure 810 may produce an on/off input signal according to the pushing of the shaft 321 and perform the input function.

According to an embodiment, the switch structure 810 may be designed to provide a feeling of a physical click from an audible or tactile point of view.

An example of the switch 811 may be a dome switch or a tact switch. As the switch 811, a switch which may be physically transformed may be used, but embodiments of the present disclosure are not limited thereto. For example, as the switch 811, any other various types of switches may be used which are able to detect touches although not physically transformed. For example, as the switch 811, a switch including a sensor for detecting the linear motion of the shaft 321 may be used. In this case, the switch 811 may measure the distance between an end of the shaft 321 and the switch 811, determine whether the switch 811 and the shaft 321 contact each other based on the measured distance, and produce an on/off input signal according to the result of determination.

The switch structure 810 may be electrically connected with the circuit board part 330. According to an embodiment, the circuit board part 330 may be disposed inside the internal structure 800, and the switch structure 810 may be formed on the outer side surface 800*c* and third end 800*a* of the internal structure 800. Thus, the stylus pen (e.g., 201 of FIG. 6) may have a conductive path which connects the circuit board part 330 and the switch structure 810 inside and outside the internal structure 800.

According to an embodiment, the conductive path may include a conductive portion (e.g., 813) positioned inside the second inner space (e.g., 301 of FIG. 3B). The conductive portion (e.g., 813) may be positioned on the outer side surface 800*c* of the internal structure 800. According to an embodiment, the conductive portion (e.g., 813) positioned on the outer side surface 800*c* of the internal structure 800 may be formed so that a portion thereof is covered on the surface of the internal structure 800 while at least another portion thereof is viewed or exposed to the outside. The conductive protrusion (e.g., 813) positioned on the outer side surface 800*c* of the internal structure 800 may include parts which are electrically connected with each other via, e.g., soldering or welding, between different conductive members.

According to an embodiment, the conductive path may include the conductive portion (e.g., 821) positioned in the third inner space 801. According to an embodiment, the conductive portion (e.g., 821) positioned in the third inner space 801 may extend in parallel from the circuit board part 330 disposed inside the internal structure 800 along the lengthwise direction of the internal structure 800. For example, as the conductive portion 821, LDS may correspond in an electrical connection through LDS between the circuit board part 330 and the switch structure 810. Two or more, rather than one, conductive portions (e.g., 821*a* and 821*b*) may be formed in the third inner space 801 as shown. At least one (e.g., a first conductive portion 821*a* in the third inner space) of the two or more conductive portions may form a feeding line, and another (e.g., a second conductive portion 821*b* in the third inner space) may form a ground line. From a point of view of securing electrical safety, the two or more conductive portions (e.g., 821*a* and 821*b*) may be spaced apart from each other at a predetermined height from the circuit board part 330 of the internal structure 800.

According to an embodiment, the conductive path may further include a conductive portion (e.g., 822), which connects the conductive portion (e.g., 821) positioned in the third inner space 801 and the conductive portion (e.g., 813) positioned on the outer side surface 800*c* of the internal structure 800, in the second inner space (e.g., 301 of FIG. 3B). For example, the conductive portion (e.g., 822) may correspond to a via which connects different conductive portions (e.g., 821 and 813) positioned at different heights (or different levels).

According to an embodiment, the conductive path may include the conductive portion (e.g., 830) utilizing a certain contact structure mounted on the printed circuit board 332. According to an embodiment, the printed circuit board 332 may be included in the third inner space 801, and the conductive portion (e.g., 830), as the contact structure, may be formed on the printed circuit board 332. For example, when a certain conductive portion (e.g., 821*a* and/or 821*b*) in the third inner space 801 is spaced apart at a predetermined height from the circuit board part 330 of the internal structure 800, the circuit board part 330 and the conductive portion (e.g., 821*a* and/or 821*b*) in the third inner space 801 may be electrically connected with each other using the conductive portion (e.g., 830), as at least one contact structure.

According to an embodiment, the conductive path may be formed by at least one conductive portion or a combination of at least two conductive portions as described above. For example, the conductive path may be formed as any one of the electrical connection via LDS, the electrical connection using the contact structure, or the electrical connection by soldering between different conductive portions or by a combination of at least two of the above-described methods.

According to an embodiment, the switch 811 may be soldered and electrically connected to the switch board 812. The switch board 812 may be electrically connected with the conductive portion 813 positioned on the outer side surface 800c of the internal structure 800, and the conductive portion 813 may be connected with the conductive portions 821a and 821b positioned in the third inner space through at least one via (e.g., 822). The conductive portions 821a and 821b positioned in the third inner space may extend along the lengthwise direction of the internal structure 800 and connect with the circuit board part 330 and/or various electronic parts 840 and 850 (e.g., the fourth wireless communication circuit) through at least one contact structure 830.

According to an embodiment, the stylus pen (e.g., 201 of FIG. 6) may be formed so that the conductive portion is viewed (or exposed) to the outside of the internal structure 800 as the switch structure 810 is disposed on the outer side surface 800c and/or third end 800a of the internal structure 800 and the circuit board part 330 is disposed in the inside (e.g., the third inner space 801) of the internal structure 800. Since the stylus pen 201 takes such a design as the internal structure 800 is inserted into the inner space (e.g., 301 of FIG. 3B) of the pen housing (e.g., 300 of FIG. 3B)) in the process of assembly, it may be required to facilitate assembly of the internal structure 800 in designing the stylus pen 201. It may also be required to allow no current leaks to occur where the switch structure 810 and the conductive portion contact. In particular, it may be material to prevent corrosion to internal parts by water permeating through the gap of the stylus pen 201 (e.g., the gap formed between the first button 201a and the ejection body 322 or between the second end 300b and the ejection body 322).

To that end, the stylus pen 201 may have at least one waterproof structure 860 for waterproofing the conductive portion formed to be viewed (or exposed) to the outer circumference of the internal structure 800.

Referring back to FIG. 8, according to an embodiment, the waterproof structure 860 may be positioned in an area corresponding to the conductive portion (e.g., 813) positioned adjacent on the outer side surface 800c of the internal structure 800. For example, water permeating through the gap between the first button 201a and the ejection body 322 may flow along the surface of the internal structure 800 and the switch board 812 where the switch 811 is mounted to the inside of the pen housing (e.g., 300 of FIG. 3B), and a portion of the water may be condensed around the conductive portion (e.g., 813) causing a current leak.

According to an embodiment, the conductive portion (e.g., 813) may be formed at the boundary on the outer side surface 800c of the internal structure 800 and the switch board 812 on which the switch is mounted. As the waterproof structure 860 is formed at the boundary, the electrical contact may be safely protected from water permeating through the gap.

According to an embodiment, a waterproofing structure may be applied to the stylus pen 201 in various embodiments. Various embodiments of a waterproof structure are described below with reference to FIGS. 9 to 11.

Figure 9:
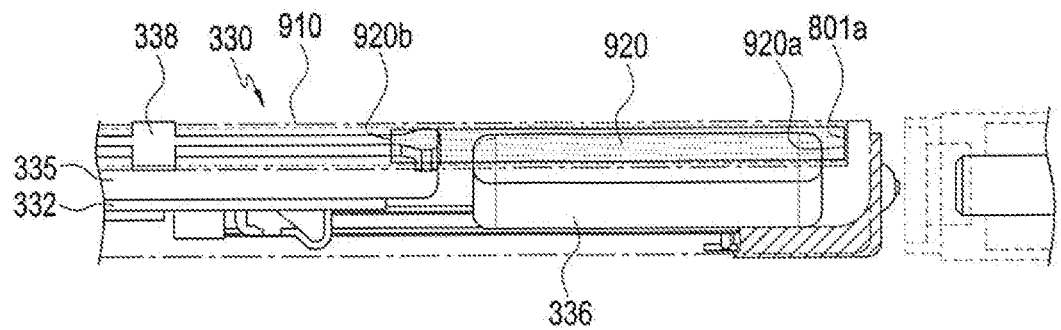
FIG. 9 is a view illustrating a waterproof structure formed to cover at least part of a cover of a circuit board part according to an embodiment.

FIG. 9 is a view illustrating a waterproof structure formed to cover at least part of a cover 335 of a circuit board part (e.g., 330 of FIG. 3B) according to an embodiment.

Other various waterproof structures other than the waterproof structure (e.g., 860) of FIG. 8 may be provided.

Referring to FIG. 9, a waterproof structure 920 may be formed on an upper area 910 of the circuit board part 330. For example, the waterproof structure 920 may be formed of a waterproof resin.

According to an embodiment, the waterproof structure 920 may be added inside the cover of the circuit board part 330 or may be provided on the top surface of the circuit board part 330, replacing the cover of the circuit board part 330. According to an embodiment, a first end 920a of the waterproof structure 920 may be brought in tight contact with the inner surface 801 which is positioned adjacent to the third end (e.g., 800a of FIG. 8) of the internal structure (e.g., 800 of FIG. 8). A second end 920b of the waterproof structure 920 may extend towards the inner surface 801a along the lengthwise direction of the internal structure (e.g., 800 of FIG. 8). The second end 920b of the waterproof structure 920 may extend up to the position where it covers at least part of the cover 33b, with the first end 920a of the waterproof structure 920 tightly contacting the inner surface 801a of the third end (e.g., 800a of FIG. 8) of the internal structure (e.g., 800 of FIG. 8).

As in the embodiment of FIG. 9, the stylus pen 201 has the waterproof structure 920, thus preventing permeation of water through the gap to various electronic parts (e.g., the printed circuit board 332 and/or battery 336) mounted on the circuit board part (e.g., 330 of FIG. 3B) or its surroundings while protecting them against current leaks or corrosion.

According to an embodiment, the waterproof structure 920 may be formed in only a certain upper area of the circuit board part (e.g., 330 of FIG. 3B) to protect a specific electronic part (e.g., the printed circuit board 332 and/or battery 336), but embodiments of the disclosure are not limited thereto. For example, as shown in FIGS. 9 and 10, the waterproof structure 920 may be in the form of extending along the lengthwise direction of the internal structure (e.g., 800 of FIG. 8) to prevent water permeation into other electronic parts or other structures or gaps between the electronic parts or between the structures inside the third inner space (e.g., 801 of FIG. 8).

The waterproof structure 920 shown in FIG. 9 may be used additionally or alternatively to the waterproof structure 860 described above in connection with FIG. 8, and the stylus pen (e.g., 201 of FIG. 3B) may provide full protection to other electronic parts including the conductive portions against current leaks and corrosion.

Although not shown in the drawings, according to an embodiment, a packing ring (e.g., an O-ring), as another waterproof structure, may be additionally provided which surrounds the outer side surface (e.g., 800c of FIG. 8) of the internal structure (e.g., 800 of FIG. 8).

Figure 10:
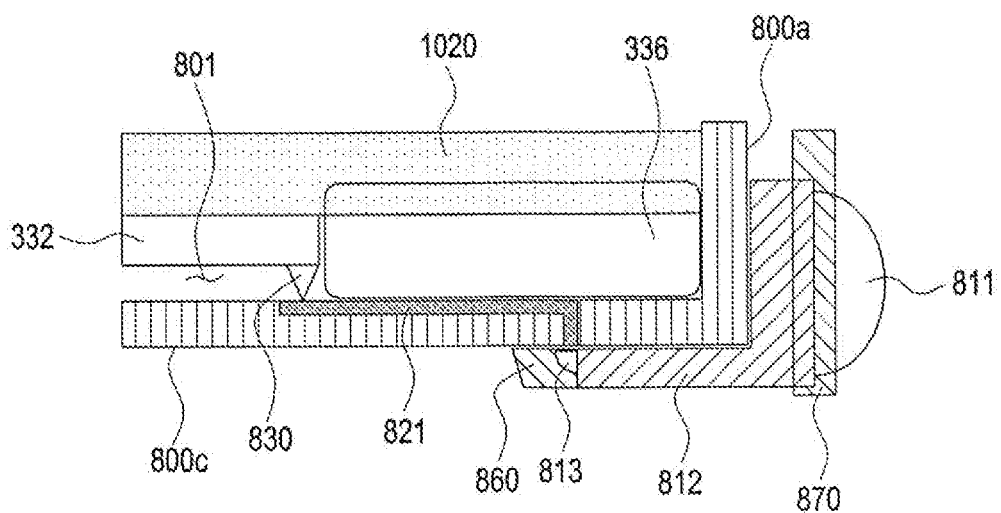
FIG. 10 is a view illustrating the embodiment of FIG. 8 focusing on various waterproof structures according to an embodiment.

FIG. 10 is a view illustrating the embodiment of FIG. 8 focusing on various waterproof structures (e.g., 860, 870, and 1020).

According to an embodiment, the stylus pen (e.g., 201 of FIG. 3B) may have various waterproof means to prevent current leaks and corrosion due to water permeation into the internal structure (e.g., 800 of FIG. 8).

Referring to FIG. 10, according to an embodiment, the stylus pen (e.g., 201 of FIG. 3B) may have a waterproof structure 860 in an area corresponding to the conductive portion (e.g., 813) positioned adjacent on the outer side surface 800c of the internal structure 800. According to an embodiment, the stylus pen (e.g., 201 of FIG. 3B) may add a waterproof structure 870 for protecting the contact between the switch 811 and the switch board 812 on which the switch is mounted. According to an embodiment, the stylus pen (e.g., 201 of FIG. 3B) may add a waterproof structure (e.g., a waterproof resin) 1020 for protecting other various electronic parts and structures in the third inner space 801 and the printed circuit board 332.

For example, when water permeates along the gap between the first button (e.g., 201a of FIG. 2) and the ejection body (e.g., 322 of FIG. 3B), the conductive portion between the switch 811 and the switch board 812 on which the switch is mounted may be waterproofed by the waterproof structure 870. The waterproof structure 860 may waterproof the conductive portion (e.g., 813) against water flowing in along the outer side surface 800c of the internal structure 800. The waterproof structure 1020 may waterproof the electronic parts and/or structures on the third inner space 801 against water which may permeate through other portions of the internal structure (e.g., 800 of FIG. 8) than the boundary of the switch board 812 on which the switch is mounted.

Although FIG. 10 illustrates that the waterproof structure 860 and the waterproof structure 1020 are positioned opposite each other with respect to the internal structure 800, the present disclosure is not limited thereto.

According to an embodiment, the detailed positions of the waterproof structures of FIG. 10 may be designated as various ones.

Figure 11:
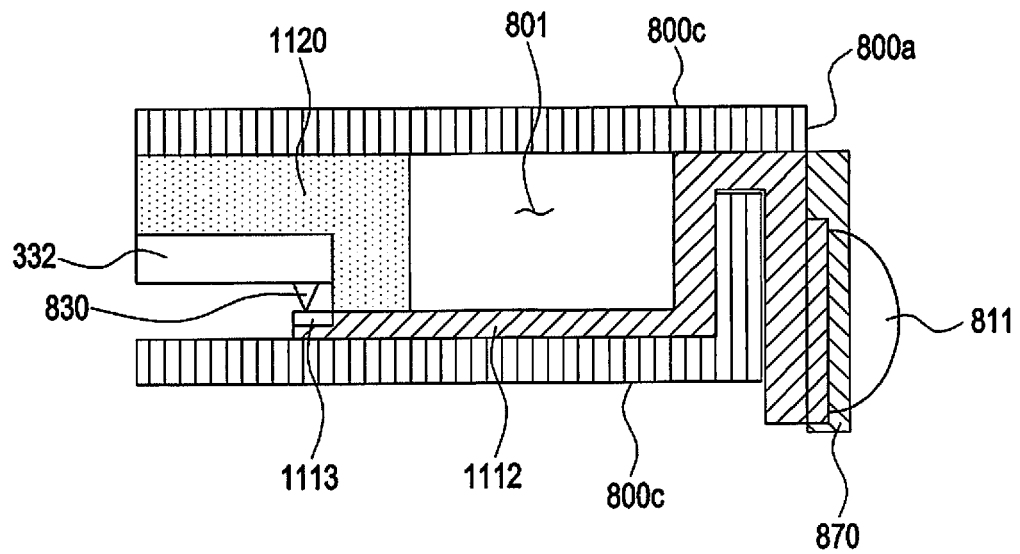
FIG. 11 is a view illustrating waterproof structures according to an embodiment.

FIG. 11 is a view illustrating waterproof structures 870 and 1120 according to an embodiment.

Referring to FIG. 11, according to an embodiment, the stylus pen (e.g., 201 of FIG. 3B) may add a waterproof structure 870 for protecting the contact between the switch 811 and the switch board 1112 (e.g., the switch board 812 of FIG. 8) on which the switch 811 is mounted. According to an embodiment, the stylus pen (e.g., 201 of FIG. 3B) may add a waterproof structure (e.g., a waterproof resin) 1120 for protecting other various electronic parts and structures in the third inner space 801 and the printed circuit board 332.

According to an embodiment, the stylus pen (e.g., 201 of FIG. 3B) may include no conductive portion on the outer side surface 800c of the internal structure (e.g., 800 of FIG. 8).

According to an embodiment, the switch 811 may face the second end (e.g., 300b of FIG. 3B) of the pen housing (e.g., 300 of FIG. 3B), and the switch board 1112 on which the switch is mounted may extend directly to the third inner space 801 of the internal structure (e.g., 800 of FIG. 8) without extending over the outer side surface 800c of the internal structure (e.g., 800 of FIG. 8). The switch board 1112 on which the switch is mounted may penetrate the third end 800a of the internal structure (e.g., 800 of FIG. 8). After the switch board 1112 on which the switch is mounted extends up to the position where the contact structure 830 of the printed circuit board 332 is formed, the contact structure 830 and conductive portion 1113 formed on the switch board 1112 may contact and electrically connect to each other.

No battery is shown in FIG. 11 unlike in FIG. 10. According to an embodiment, a battery other than EDLC may be adopted as the battery in which case the arrangement of the structures and electronic parts in the third inner space 801 may be set to be different from the example shown in FIG. 10. In this case, the waterproof structure 1120 disposed in the third inner space 801 to waterproof the conductive portion 1113 formed on the switch board 1112 and the printed circuit board 332 may be in the form of covering at least part of the switch board 1112 and the printed circuit board 332. According to an embodiment, the waterproof structure 1120 may be in the form of covering at least part of the conductive portion 1113.

As such, according to an embodiment, the stylus pen (e.g., 201 of FIG. 3B) may have various waterproof structures.

Figure 12:
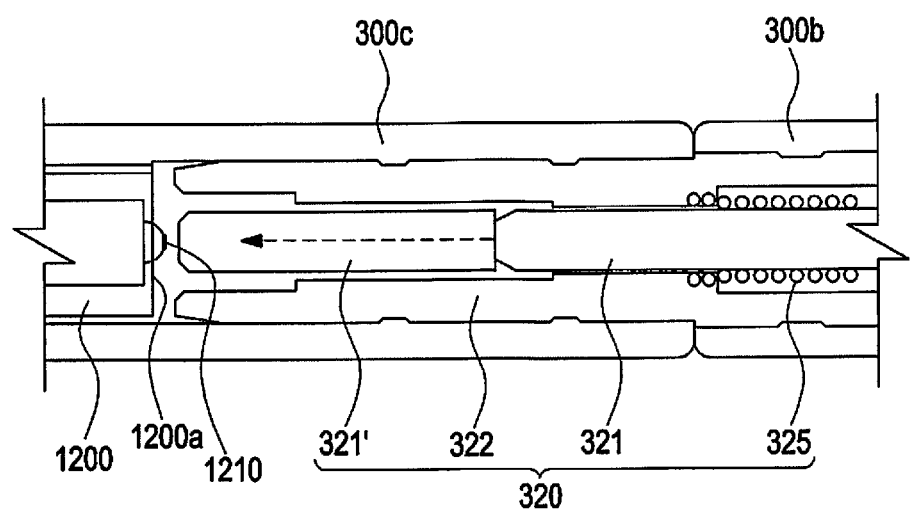
FIG. 12 is a view illustrating a dual-shaft structure according to an embodiment.

FIG. 12 is a view illustrating a dual-shaft structure 321 and 321' according to an embodiment. FIG. 12 illustrates an example in which a switch structure 1210 is formed at the third end 1200a of the internal structure 1200 (e.g., the internal structure 600 of FIG. 6), and an ejection member 320 including shafts 321 and 321' is formed facing the switch structure 1210.

Referring to FIG. 12, according to an embodiment, the shaft 321 for transferring a push to the switch structure 1210 may be deformed or damaged by its long-term use. For example, a stress in the direction perpendicular to the axial direction of the shaft, a stress in the direction parallel with the axial direction, or a twisting stress may be exerted on the shaft 321 and, if the fatigue load exceeds its permitted threshold, the shaft may be bent or broken. When the shaft 321 is bent or broken, the contact between the switch structure 1210 and the shaft 321 may not be uniformly formed and a switch input may not be normally done while using the stylus pen (e.g., 201 of FIG. 3B).

According to an embodiment, the shaft 321 included in the ejection member 320 may be formed in the dual-shaft structure 321 and 321' as shown in FIG. 12 and may thus be prevented from damage or deformation.

According to an embodiment, the stylus pen (e.g., 201 of FIG. 3B) may include a dual-shaft structure 321 and 321' as the shaft for transferring a push to the switch structure 1210. According to an embodiment, the dual-shaft structure 321 and 321' may include a first-first shaft 321 and a first-second shaft 321'. The first-first shaft 321 may be positioned adjacent the first-second shaft 321', and the respective ends of the shafts 321 and 321' may contact each other. The first-first shaft 321 and the first-second shaft 321' may move together while contacting each other. In such a structure, when the user pushes the first button (e.g., 201a of FIG. 2), the force of pushing exerted on the first button (e.g., 201a of FIG. 2) may be transferred via the first-first shaft 321 to the first-second shaft 321', allowing the first-second shaft 321' to contact the switch structure 1210.

According to an embodiment, in the dual-shaft structure 321 and 321', the first-second shaft 321' may be formed of a harder or more rigid material than the first-first shaft 321. By forming the portion contacting the switch structure 1210 with a relatively more rigid structure, the shafts may be prevented from being bent or broken even though the stylus pen (e.g., 201 of FIG. 3B) is used for a long time. This may also allow the contact between the switch structure 1210 and the shaft to remain uniform.

Figure 13:
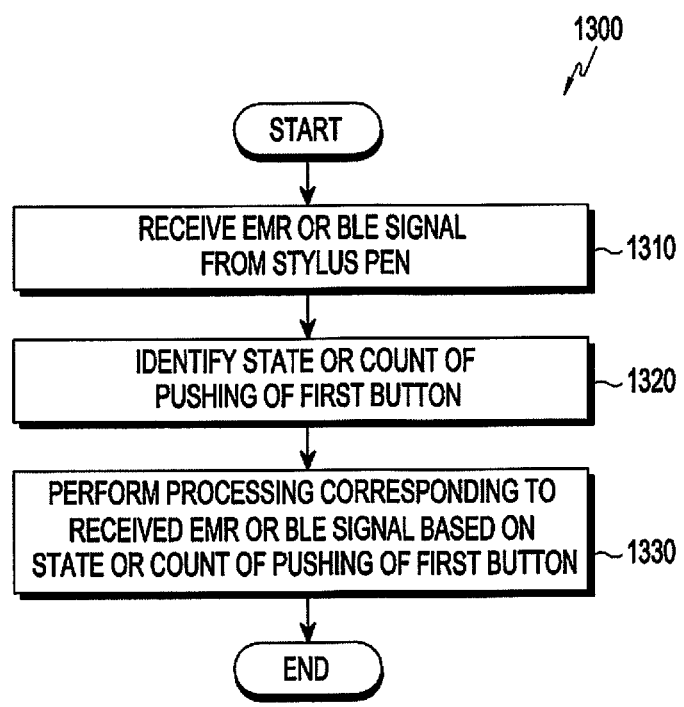
FIG. 13 is a flowchart illustrating a method of operating an electronic device according to an embodiment.

FIG. 13 is a flowchart 1300 illustrating a method of operating an electronic device (e.g., the electronic device 101 of FIG. 1) according to an embodiment.

Referring to FIG. 13, according to an embodiment, the electronic device (e.g., the processor 120 of FIG. 1) may receive an EMR signal (e.g., a wireless signal via EMR communication) or a BLE signal (e.g., a wireless signal via BLE communication) from the stylus pen (e.g., 201 of FIG. 3B) in step 1310. According to an embodiment, the processor 120 may receive the EMR signal using the third wireless communication circuit (e.g., the third wireless communication circuit 409 of FIG. 4). According to an embodiment, the EMR signal may include a signal (e.g., the third signal) transmitted in an electromagnetic resonance scheme from the fourth wireless communication circuit (e.g., the fourth wireless communication circuit 405 of FIG. 4) as the second button (e.g., the second button 337 of FIG. 3B) of the stylus pen 201 is pushed. According to an embodiment, the processor 120 may receive the BLE signal using the first wireless communication circuit (e.g., the first wireless communication circuit 407 of FIG. 4). According to an embodiment, the BLE signal may include a signal (e.g., the first signal, second signal, or fourth signal) transmitted to the electronic device 101 in a BLE communication scheme from the second wireless communication circuit (e.g., the second wireless communication circuit 403 of FIG. 4) as the first button (e.g., the first button 201*a* of FIG. 2) or the second button 337 of the stylus pen 201 is pushed.

According to an embodiment, the electronic device (e.g., the processor 120 of FIG. 1) may identify the state or count of pushing of the first button 201*a* in step 1320. According to an embodiment, the processor 120 may identify the state and count of pushing of the first button 201*a* based on the number of times of reception of the signal (e.g., a first button pushing signal) indicating the pushing of the first button 201*a*, received from the second wireless communication circuit 403. According to an embodiment, the first button pushing signal may be a signal transmitted from the stylus pen 201 in response to the pushing of the first button 201*a*. According to an embodiment, the first button pushing signal may be received by the first wireless communication circuit 407, included in or along with the BLE signal, from the second wireless communication circuit 403 in a case where the BLE signal (e.g., the first signal or second signal) is transmitted to the first wireless communication circuit 407 as the first button 201*a* is pushed. According to an embodiment, the processor 120 may identify whether the stylus pen 201 is inserted into the electronic device 101 and is currently being charged. When the stylus pen 201 is inserted into the electronic device 101, the first button 201*a* may be in the state of having been pushed. According to an embodiment, the processor 120 may identify the time when the charging of the stylus pen 201 in the electronic device 101 stops. In this case, the stylus pen 201 may be in the state of having been removed from the electronic device 101 as the user pushes the first button 201*a*. According to an embodiment, the processor 120 may determine that an identifier (e.g., flag value) for the signal indicating the charging (e.g., the pushed state of the first button 201*a*) of the stylus pen is 1 based on the signal transmitted from the stylus pen 201 at the time when the charging of the stylus pen 201 in the electronic device 101 stops. In this case, the state of the first button 201*a* may be a pulled state. According to an embodiment, the flag value may be varied depending on the number of times in which the first button pushing signal is received. For example, according to an embodiment, the flag value may be set to 0 by the processor 120 of the electronic device 101 when the first button 201*a* is in the pushed state. According to an embodiment, the flag value may be set to 1 by the processor 120 of the electronic device 101 when the first button 201*a* is in the push-released state (e.g., the pulled state). According to an embodiment, the flag value may be varied into various values.

According to an embodiment, after the charging of the stylus pen 201 stops, the processor 120 may identify the count of reception of the first button pushing signal received from the first wireless communication circuit (e.g., the first wireless communication circuit 407 of FIG. 4) and determine the flag value based on the identified count of reception of the first button pushing signal. For example, when the first button pushing signal is received an odd number of times, the flag value may be set to 0 and, when the first button pushing signal is not received or is received an even number of times, the flag value may be set to 1.

According to an embodiment, the electronic device (e.g., the processor 120 of FIG. 1) may perform processing corresponding to the received EMR signal (e.g., the third signal) or BLE signal (e.g., the first signal, second signal, or fourth signal) based on the state or count of pushing of the first button 201*a* in step 1330.

According to an embodiment, when the EMR signal (e.g., the third signal) is received, the processor 120 may perform processing corresponding to the received EMR signal (e.g., the third signal). According to an embodiment, the processing corresponding to the EMR signal may include performing a predesignated task (e.g., executing a predesignated application (e.g., an air command application)). According to an embodiment, upon identifying that the pushing signal of the first button 201*a* is received an even number of times within a predesignated time (e.g., 4 seconds), the processor 120 may disregard the received EMR signal (e.g., the third signal (e.g., omit the processing corresponding to the EMR signal).

According to an embodiment, when the BLE signal is received from the stylus pen 201, the processor 120 may perform processing corresponding to the received BLE signal based on the determined flag value. For example, according to an embodiment, in a case where the first button pushing signal is received once while the stylus pen 201 is being charged so that the flag value is set to 1 (e.g., the first button 201*a* changes to the pulled state) and then the BLE signal is received, the processor 120 may determine that the received BLE signal is the first signal transmitted from the second wireless communication circuit 403 (e.g., the BLE signal transmitted by the pushing of the first button 201*a* to allow the inserted stylus pen 201 to be removed from the electronic device) and disregard the first signal (e.g., omits the processing on the first signal).

According to an embodiment, in a case where the flag value turns to 0 (e.g., after the first signal is received, the first button pushing signal is not received any longer or the first button pushing signal is further received an even number of times) and then the BLE signal is received, the processor 120 may determine that the received BLE signal is the fourth signal transmitted by the second wireless communication circuit 403 by the pushing of the second button 337 (e.g., a signal to instruct a predesignated task to be performed). In this case, according to an embodiment, the processor 120 may perform processing corresponding to the fourth signal (e.g., capturing using a camera application or activating the microphone input functionality using an intelligent application). In a case where the flag value is determined to be 0 (e.g., after the first signal is received, the first button pushing signal is further received an odd number of times) and then the BLE signal is received, the processor 120 may determine that the received BLE signal is the fourth signal. In this case, according to an embodiment, the processor 120 may refrain from performing processing on the received fourth signal (e.g., performing a predesignated task).

According to an embodiment, in a case where the BLE signal is received at the time when the flag value is changed (e.g., simultaneously with the reception of the first button pushing signal or within a predesignated proximate time after the first signal is received), the processor 120 may determine that the received BLE signal is the second signal transmitted by the second wireless communication circuit 403 by the pushing of the first button 201*a*. In this case, according to an embodiment, the processor 120 may perform processing corresponding to the second signal (e.g., executing a camera application or intelligent application). According to an embodiment, the method for the processor 120 to identify the state or count of pushing of the first button 201*a* may be implemented in a scheme of receiving a signal containing the information indicating the state or count of pushing of the first button 201*a* from the second wireless communication circuit 403 in response to the pushing of the first button 201*a*.

Figure 14:
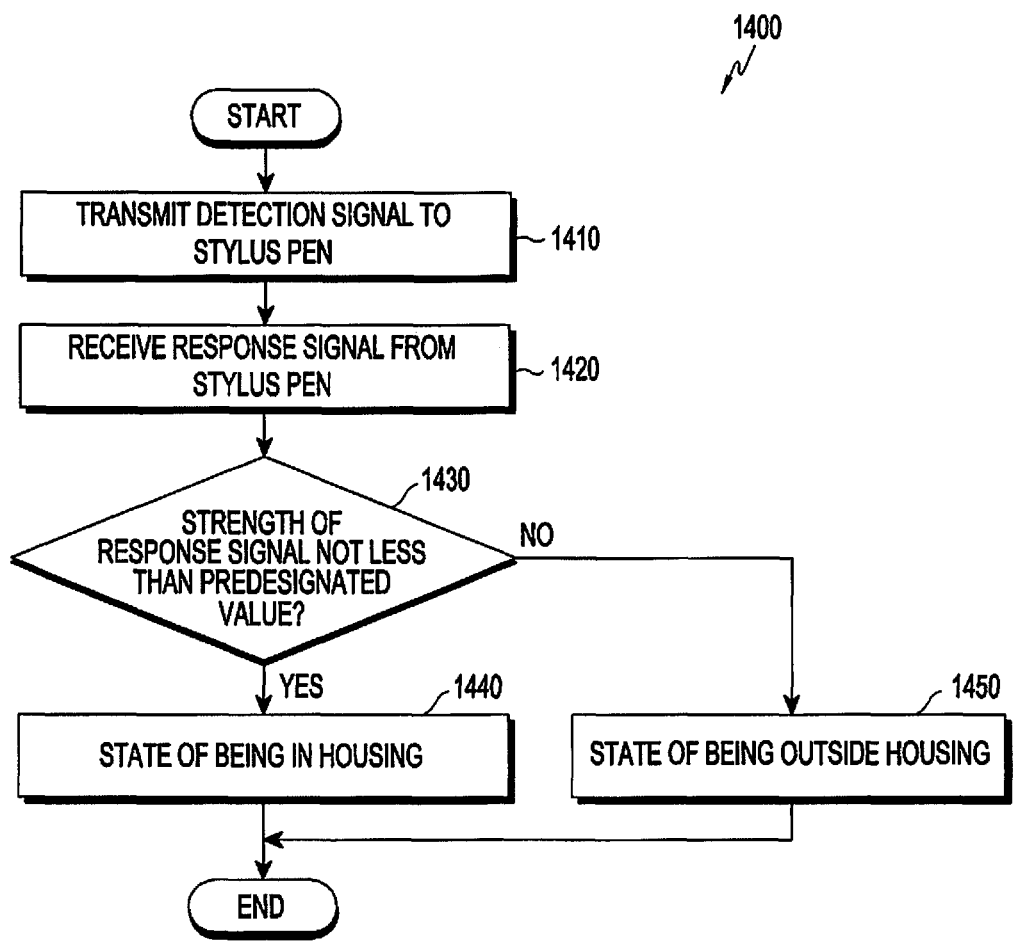
FIG. 14 is a flowchart illustrating a method of operation of an electronic device to identify whether a stylus pen is positioned inside a housing according to an embodiment.

FIG. 14 is a flowchart 1400 illustrating a method of operation in which an electronic device (e.g., the electronic device 101 of FIG. 1) identifies whether a stylus pen (e.g., the stylus pen 201 of FIG. 2) is positioned inside a housing (e.g., the housing 210 of FIG. 2) according to an embodiment.

Referring to FIG. 14, according to an embodiment, the electronic device (e.g., the processor 120 of FIG. 1) may transmit a detection signal to the stylus pen 201 in step 1410. According to an embodiment, the electronic device 101 may transmit the detection signal to the fourth wireless communication circuit (e.g., the fourth wireless communication circuit 405 of FIG. 4) using the detection coil (or the first charging coil) included in the first inner space (e.g., the first inner space 212 of FIG. 2). According to an embodiment, the first charging coil may include at least one reactance element (e.g., an inductor). According to an embodiment, the detection signal may include an electromagnetic signal having a particular frequency for identifying whether the stylus pen 201 is positioned inside the first inner space (e.g., the first inner space 212 of FIG. 2). According to an embodiment, the transmission of the detection signal may be performed in an electromagnetic induction scheme from the detection coil to the EMR coil (e.g., the coil 313 of FIG. 3B) included in the fourth wireless communication circuit 405. According to an embodiment, the detection signal may be the same signal as the charging signal described above in connection with FIG. 4.

According to an embodiment, the electronic device (e.g., the processor 120 of FIG. 1) may receive a response signal from the stylus pen 201 in step 1420. According to an embodiment, the processor 120 may transmit the detection signal to the EMR coil (e.g., the coil 313 of FIG. 3B) using the detection coil for a predetermined time. According to an embodiment, the energy stored in the battery (e.g., the battery 336 of FIG. 3B) of the stylus pen 201 may be transferred to the EMR coil (e.g., the coil 313 of FIG. 3B) as the detection signal is transmitted. According to an embodiment, an electromagnetic field may be produced between the detection coil and the EMR coil (e.g., the coil 313 of FIG. 3B) by the energy transferred to the EMR coil (e.g., the coil 313 of FIG. 3B) and, thus, an induced current (e.g., a response signal) may be induced at the detection coil (e.g., received by the detection coil).

According to an embodiment, the electronic device (e.g., the processor 120 of FIG. 1) may identify whether the strength of the response signal is a predesignated value or more in step 1430. According to an embodiment, the predesignated value may indicate a predesignated threshold.

According to an embodiment, when the strength of the response signal is the predesignated value or more, the electronic device (e.g., the processor 120 of FIG. 1) may identify that the stylus pen 201 is positioned inside the housing 210 in step 1440. For example, the stylus pen 201 may be in the state of being charged by the electronic device 101.

According to an embodiment, when the strength of the response signal is less than the predesignated value, the electronic device (e.g., the processor 120 of FIG. 1) may identify that the stylus pen 201 is in the state of being positioned outside the housing 210 in step 1450.

According to an embodiment, the electronic device (e.g., the processor 120 of FIG. 1) may include a detection coil in the electromagnetic induction panel. According to an embodiment, the processor 120 may detect whether the detection coil where the response signal (e.g., induced current) from the fourth wireless communication circuit 405 is transmitted (or induced) is the detection coil included in the first inner space (e.g., the first inner space 212 of FIG. 2) or the detection coil included in the electromagnetic induction panel. According to an embodiment, the processor 120 may detect whether the stylus pen 201 is positioned inside the housing 210 (e.g., in the state of having been inserted into the first inner space 212) or positioned outside the housing 210 (e.g., in the state of being used over the display of the electronic device).

According to an embodiment, the identification of whether the stylus pen 201 is positioned inside the electronic device 101 may be performed by the first voltage detector (e.g., the first voltage detector 507 of FIG. 5) included in the stylus pen 201. For example, the stylus pen 201 may detect the strength of the detection signal using the first voltage detector (e.g., the first voltage detector 507 of FIG. 5) and, when the strength of the detection signal is a predesignated voltage (e.g., 3.5V) or more, identify that the stylus pen 201 is being charged inside the electronic device 101. In this case, the stylus pen 201 may transmit charging state information (e.g., information indicating that the stylus pen 201 is being charged) to the electronic device 101 using the second wireless communication circuit (e.g., the second wireless communication circuit 403 of FIG. 4), and the electronic device 101 may identify the charging state information, thereby identifying that the stylus pen 201 is positioned inside the electronic device 101.

Figure 15:
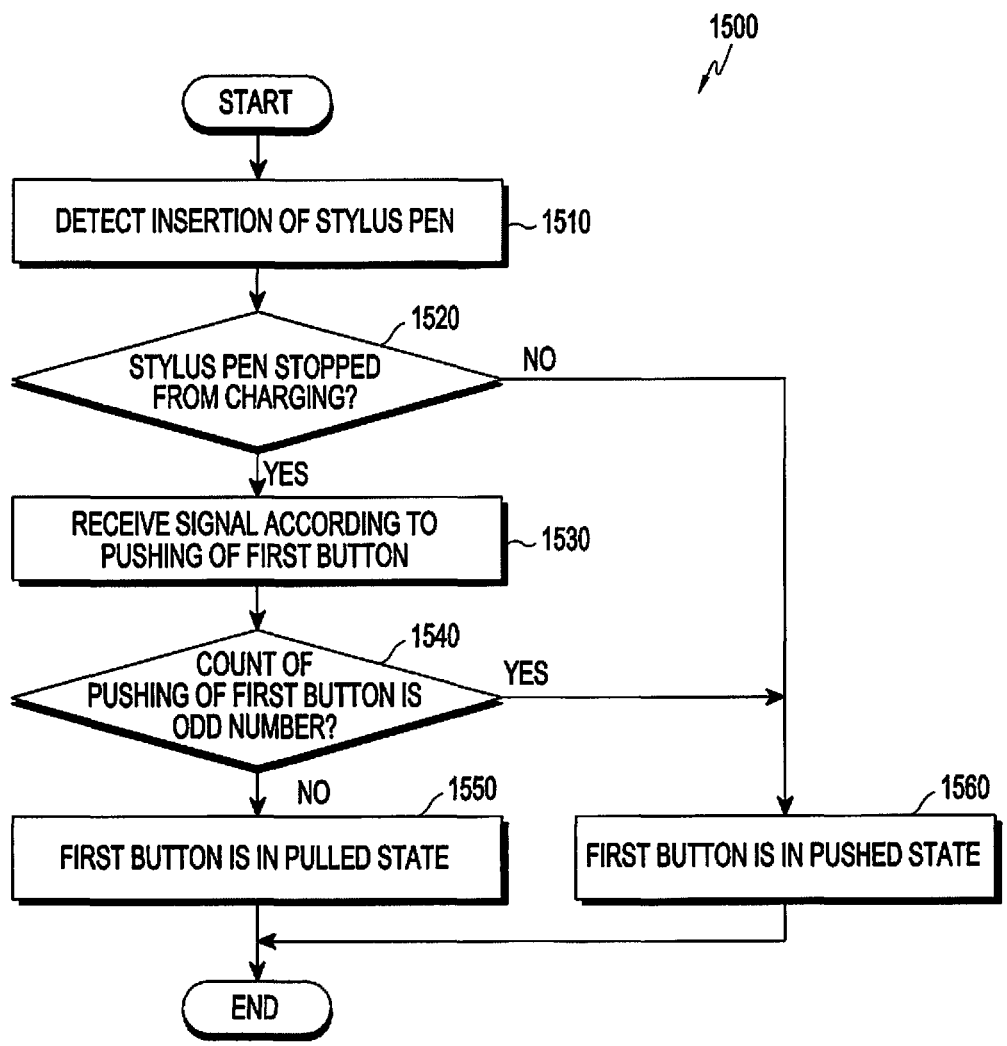
FIG. 15 is a flowchart illustrating a method of operation of an electronic device to identify whether a first button of a stylus pen is pushed according to an embodiment.

FIG. 15 is a flowchart illustrating a method in which an electronic device (e.g., the electronic device 101 of FIG. 1) identifies whether a first button (e.g., the first button 201a of FIG. 2) of a stylus pen (e.g., the stylus pen 201 of FIG. 2) is in the pushed state according to an embodiment.

Referring to FIG. 15, according to an embodiment, the electronic device (e.g., the processor 120 of FIG. 1) may detect that the stylus pen is positioned inside in step 1510. According to an embodiment, the processor 120 may detect that the stylus pen 201 is inserted in the electronic device and charged in the first inner space (e.g., the first inner space 212 of FIG. 2) in steps 1410 to 1450 of FIG. 14.

According to an embodiment, the electronic device (e.g., the processor 120 of FIG. 1) may identify whether the charging of the stylus pen stops in step 1520. According to an embodiment, unless the charging of the stylus pen 201 inside the electronic device 101 stops, the processor 120 may identify that the first button 201a is in the pushed state.

According to an embodiment, the electronic device (e.g., the processor 120 of FIG. 1) may receive the signal (e.g., the first button pushing signal) according to the pushing of the first button 201a after the charging of the stylus pen 201 stops in step 1530. According to an embodiment, the processor 120 may determine that the flag value is 1 at the time when the charging of the stylus pen 201 stops (e.g., when the stylus pen 201 is removed from the first inner space). According to an embodiment, the processor 120 may receive the first button pushing signal (e.g., the first button pushing signal of FIG. 4) from the second wireless communication circuit (e.g., the wireless communication circuit 403 of FIG. 4) in the BLE communication scheme using the first wireless communication circuit (e.g., the first wireless communication circuit 407 of FIG. 4). In this case, the stylus pen 201 may be in the state of having been removed from the first inner space 212 of the electronic device 101. For example, when the first button pushing signal is received multiple times, the flag value may be changed from 1 to 0 or from 0 to 1 whenever the first button pushing signal is received. According to an embodiment, the first button pushing signal may be received in the EMR communication scheme in which case the processor 120 may receive the first button pushing signal from the fourth wireless communication circuit (e.g., the fourth wireless communication circuit 405 of FIG. 4) using the third wireless communication circuit (e.g., the third wireless communication circuit 409 of FIG. 4).

According to an embodiment, the electronic device (e.g., the processor 120 of FIG. 1) may identify whether the signal (e.g., the first button pushing signal) according to the pushing of the first button 201*a* has been received from the stylus pen 201 an odd number of times in step 1540. For example, according to an embodiment, after the stylus pen 201 is removed from the electronic device 101, the processor 120 may identify whether the first button pushing signal has been received an odd number of times from the second wireless communication circuit (e.g., the second wireless communication circuit 403 of FIG. 4) using the first wireless communication circuit (e.g., the first wireless communication circuit 407 of FIG. 4).

According to an embodiment, upon identifying that the signal (e.g., the first button pushing signal) according to the pushing of the first button 201*a* has not been received from the stylus pen 201 an odd number of times, the electronic device (e.g., the processor 120 of FIG. 1) may identify that the first button 201*a* is in the pulled state in step 1550. According to an embodiment, if the first button pushing signal is received once while the stylus pen 201 is charged and, after the charging by the electronic device 101 stops, the first button pushing signal is not received by the first wireless communication circuit 407 any longer or is received an even number of times, the processor 120 may determine that the flag value is 1. In this case, according to an embodiment, the processor 120 may identify that the state of the first button 201*a* is the pulled state.

According to an embodiment, upon identifying that the signal (e.g., the first button pushing signal) according to the pushing of the first button 201*a* has been received from the stylus pen 201 an odd number of times, the electronic device (e.g., the processor 120 of FIG. 1) may identify that the first button 201*a* is in the pushed state in step 1560. According to an embodiment, if the first button pushing signal is received once while the stylus pen 201 is charged and, after the charging by the electronic device 101 stops, the first button pushing signal is received an odd number of times by the first wireless communication circuit 407, the processor 120 may determine that the flag value is 0. In this case, according to an embodiment, the processor 120 may identify that the state of the first button 201*a* is the pushed state.

According to an embodiment, after the charging by the electronic device (e.g., the electronic device 101 of FIG. 1) stops and while the first button input signal is received by the second wireless communication circuit (e.g., the second wireless communication circuit 403 of FIG. 4) as the first button (e.g., the first button 201*a* of FIG. 2), the stylus pen (e.g., 201 of FIG. 3B) may identify that the first button 201*a* is in the pushed state and, while the first button input signal is not received, identify that the first button 201*a* is in the pulled state.

According to an embodiment, after the charging by the electronic device 101 stops and whenever the first button input signal is received by the pushing of the first button 201*a*, the stylus pen 201 may change the identifier (e.g., the flag value) from 1 to 0 or from 0 to 1 in the second wireless communication circuit 403 or the processor (e.g., the processor 220 of FIG. 3A). According to an embodiment, the flag value may be set to 1 when the stylus pen 201 is removed (or popped-up) from the electronic device 101 by the first button 201*a* (e.g., when the stylus pen 201 stops charging) and, then, whenever the first button input signal is received, it may be changed from 1 to 0 or from 0 to 1. For example, when the flag value is 1, the first button 201*a* may be in the pulled state and, when 0, the first button 201*a* may be in the pushed state.

Figure 16A:
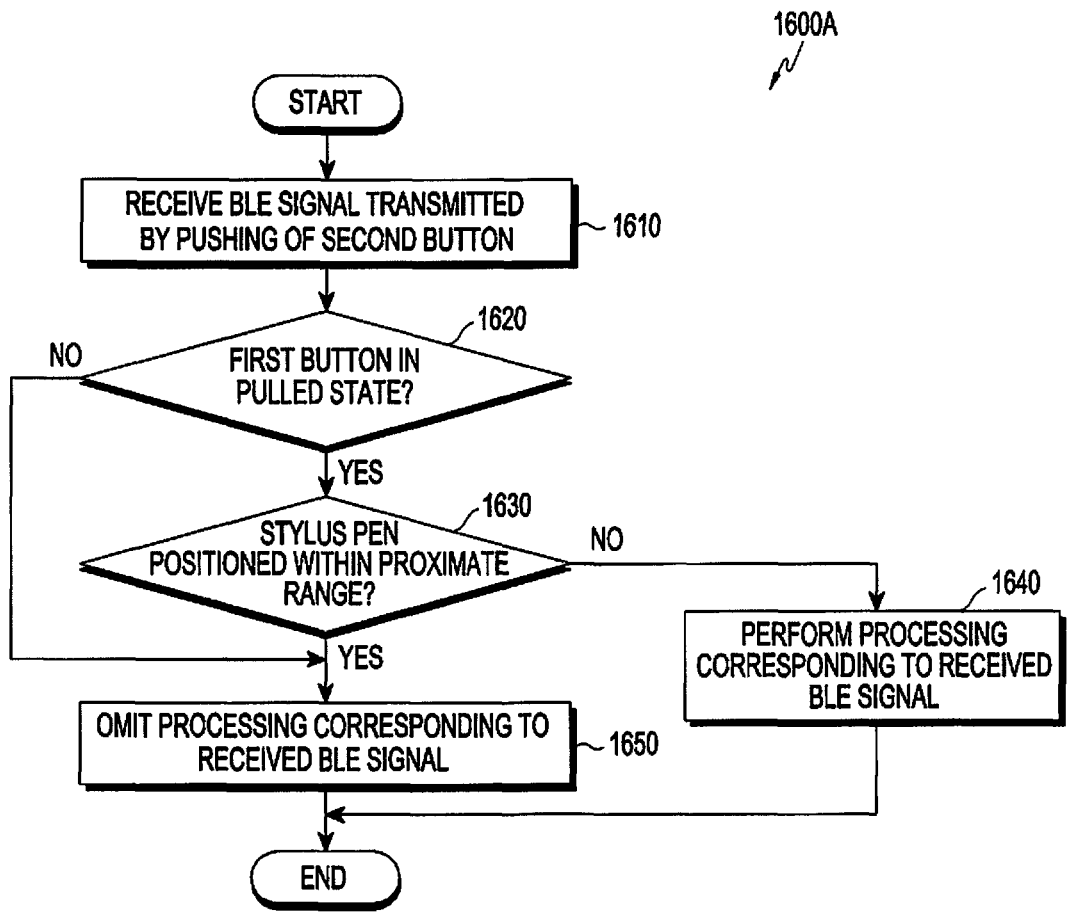
FIG. 16A is a flowchart illustrating a method of processing a BLE signal in transmitted by pushing a second button of an electronic device according to an embodiment.
Figure 16B:
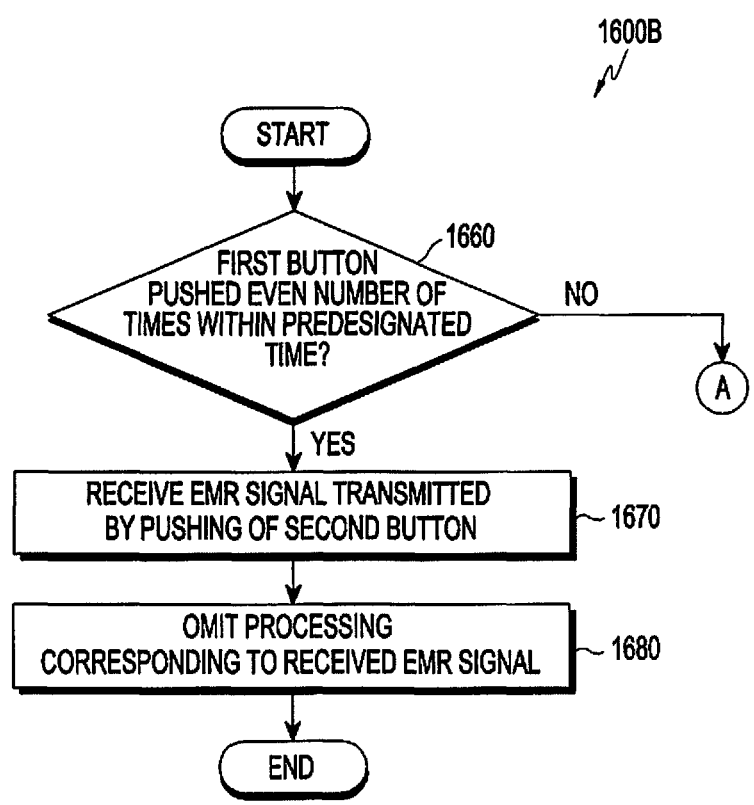
FIG. 16B is a flowchart illustrating a method of processing an EMR signal transmitted by pushing a second button of an electronic device according to an embodiment.

FIG. 16A is a flowchart 1600A illustrating a method of processing a BLE signal transmitted by pushing of a second button (e.g., the second button 337 of FIG. 3B) of an electronic device 101 (e.g., the electronic device 101 of FIG. 1) according to an embodiment. FIG. 16B is a flowchart 1600B illustrating a method of processing an EMR signal transmitted by pushing of the second button 337 of the electronic device 101 according to an embodiment.

Referring to FIG. 16A, according to an embodiment, the electronic device (e.g., the processor 120 of FIG. 1) may receive the BLE signal transmitted by pushing of the second button 337 in step 1610. According to an embodiment, the processor 120 may receive the BLE signal transmitted by the pushing of the second button 337 from the second wireless communication circuit (e.g., the second wireless communication circuit 403 of FIG. 4) using the first wireless communication circuit (e.g., the first wireless communication circuit 407 of FIG. 4).

According to an embodiment, the electronic device (e.g., the processor 120 of FIG. 1) may identify whether the first button (e.g., the first button 201*a* of FIG. 2) is in the pulled state in step 1620. According to an embodiment, the processor 120 may receive the first button pushing signal from the second wireless communication circuit 403 using the first wireless communication circuit 407. According to an embodiment, the processor 120 may determine the flag value based on the number of times in which the first button pushing signal has been received. According to an embodiment, what is described above in connection with step 1420 of FIG. 14 may apply to the determination of the flag value. According to an embodiment, the processor 120 may identify whether the first button 201*a* is in the pulled state based on the determined flag value. According to an embodiment, when the state of the first button 201*a* is the pulled state, the processor 120 may perform step 1630 and, unless the state of the first button 201*a* is the pulled state (e.g., when it is the pushed state), perform step 1650.

According to an embodiment, the electronic device (e.g., the processor 120 of FIG. 1) may identify whether the stylus pen 201 is within a proximate range in step 1630. According to an embodiment, what is described above in connection with FIG. 4 may apply to identifying, by the processor 120, whether the stylus pen 201 is within the proximate range from the display (e.g., the display 411 of FIG. 4). According to an embodiment, upon determining that the stylus pen 201 is out of the proximate range, the processor 120 may perform step 1640 and, upon determining that the stylus pen 201 is positioned within the proximate range, perform step 1650.

According to an embodiment, the electronic device (e.g., the processor 120 of FIG. 1) may perform processing corresponding to the received BLE signal in step 1640. For example, the processing corresponding to the BLE signal may include performing at least one of predesignated tasks (e.g., executing a camera application, capturing using the camera application, executing an intelligent application, or activating the microphone input function using the intelligent application).

According to an embodiment, the electronic device (e.g., the processor 120 of FIG. 1) may omit the processing corresponding to the received BLE signal (e.g., performing the predesignated task) (e.g., disregard the received BLE signal) in step 1650. According to an embodiment, when the stylus pen 201 is positioned within the proximate range from the display 411 and both the BLE signal and the EMR signal are received by the pushing of the second button 337, the processor 120 may disregard the processing corresponding to the received BLE signal and perform processing corresponding to the received EMR signal.

According to an embodiment, upon receiving a detection signal (e.g., the detection signal described above in connection with FIG. 14), the stylus pen 201 may be identified as being charged by the electronic device 101. For example, the stylus pen 201 may receive a charging signal (or detection signal) from the electronic device 101 using the EMR coil (e.g., the coil 313 of FIG. 3B) and, when the strength of the charging signal (e.g., the magnitude of the voltage) falls within a level 2 range (e.g., 3.5V or more), identify that the stylus pen 201 is being charged. In this case, the state of the first button 201a may be the pushed state. According to an embodiment, the stylus pen 201 may produce the first button pushing signal whenever the first button 201a is pushed and transmit the produced first button pushing signal to the electronic device 101 through the second wireless communication circuit 403. According to an embodiment, the second wireless communication circuit 403 may determine whether to transmit the BLE signal to the electronic device 101 based on the number of times in which the first button input signal is received at the time when the charging of the stylus pen 201 by the electronic device 101 is terminated (e.g., when the stylus pen 201 is removed from the electronic device). For example, according to an embodiment, when the first button input signal is not received or is received an even number of times at the time when the charging of the stylus pen 201 is terminated, the second wireless communication circuit 403 may selectively transmit the BLE signal based on whether the stylus pen 201 is positioned within the proximate range from the display 411. For example, when the stylus pen 201 is positioned within the proximate range (e.g., when the proximity signal is received from the electronic device 101), the second wireless communication circuit 403 may refrain from transmitting the BLE signal and, when positioned outside the proximate range, may transmit the BLE signal.

According to an embodiment, when the stylus pen 201 is positioned within the proximate range from the display 411, the second wireless communication circuit 403 may refrain from transmitting the BLE signal (e.g., the fourth signal) to the electronic device 101. According to an embodiment, when the stylus pen 201 is positioned out of the proximate range from the display 411, the second wireless communication circuit 403 may transmit the BLE signal (e.g., the fourth signal) to the electronic device 101. For example, when the first button input signal is received an odd number of times more at the time when the charging of the stylus pen 201 is terminated, the second wireless communication circuit 403 may refrain from transmitting the BLE signal (e.g., the fourth signal) to the electronic device 101.

Referring to FIG. 16B, according to an embodiment, the electronic device (e.g., the processor 120 of FIG. 1) may identify that the first button (e.g., the first button 201a of FIG. 2) has been pushed an even number of times within a predesignated time in step 1660. According to an embodiment, the processor 120 may receive the first button pushing signal corresponding to the pushing of the first button 201a from the second wireless communication circuit (e.g., the second wireless communication circuit 403 of FIG. 4). According to an embodiment, the processor 120 may count the reception of the first button pushing signal within a predesignated time (e.g., four seconds), thereby identifying whether the first button 201a has been pushed an even number of times (e.g., two times) within the predesignated time. According to an embodiment, upon identifying that the first button 201a has been pushed an even number of times within the predesignated time, the processor 120 may perform step 1670 and, unless it is identified that the first button 201a has been pushed an even number of times within the predesignated time (e.g., when the first button pushing signal is not received or is received an odd number of times within the predesignated time), perform step A (e.g., steps 1610, 1620, 1630, 1640, to 1650 described above in connection with FIG. 16A).

According to an embodiment, the electronic device (e.g., the processor 120 of FIG. 1) may receive the EMR signal transmitted by pushing of the second button 337 in step 1670. According to an embodiment, when the stylus pen 201 is positioned within a predesignated proximate range from the display 411 of the electronic device 101, the processor 120 may receive the EMR signal from the fourth wireless communication circuit (e.g., the fourth wireless communication circuit 405 of FIG. 4) using the third wireless communication circuit (e.g., the third wireless communication circuit 409 of FIG. 4) as the second button 337 is pushed.

According to an embodiment, the electronic device (e.g., the processor 120 of FIG. 1) may omit the processing corresponding to the received EMR signal in step 1680. For example, although receiving the EMR signal, the processor 120 may refrain from processing (e.g., performing a predesignated task) corresponding to the received EMR signal. According to an embodiment, when the stylus pen 201 is positioned within the predesignated proximate range from the display 411 so that both the BLE signal and the EMR signal are received by the pushing of the second button 337, the processor 120 may omit the processing corresponding to the received EMR signal and perform processing corresponding to the received BLE signal.

According to an embodiment, the stylus pen 201 may identify whether the first button 201a has been pushed an even number of times (e.g., two times) (e.g., whether the first button input signal is transmitted an even number of times from the first button 201a to the second wireless communication circuit (e.g., the second wireless communication circuit 403 of FIG. 4)) within a time (e.g., four seconds) pre-designated by the user. For example, according to an embodiment, upon identifying that the first button 201a has been pushed an even number of times within the time pre-designated by the user, the stylus pen 201, although a pushing event for the second button 337 occurs, may refrain from transmitting the EMR signal to the third wireless communication circuit 409 and may transmit the BLE signal to the first wireless communication circuit 407.

Figure 16C:
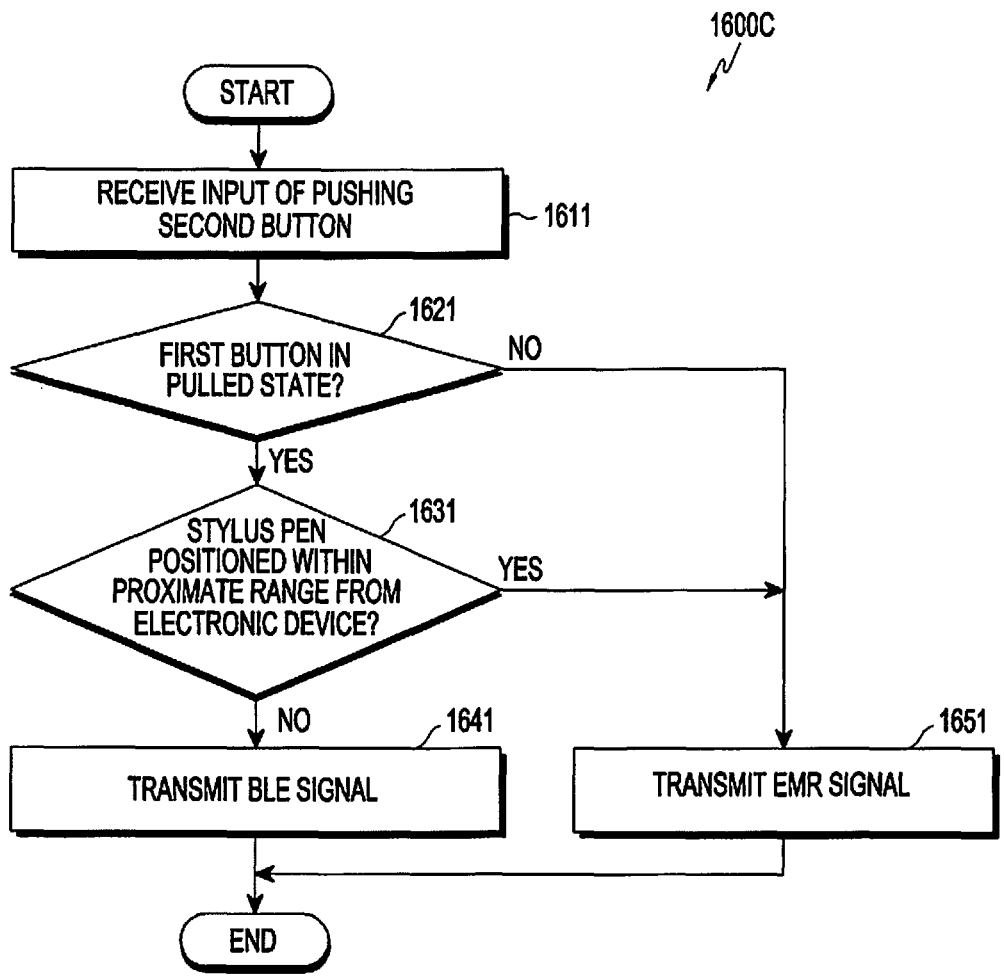
FIG. 16C is a flowchart illustrating a method of communication by pushing a second button depending on a pushed state of a first button of a stylus pen according to an embodiment.

FIG. 16C is a flowchart 1600C illustrating a communication method by pushing a second button (e.g., the second button 337 of FIG. 3B) depending on the state of pushing of a first button (e.g., the first button 201a of FIG. 2) of a stylus pen (e.g., 201 of FIG. 3B) according to an embodiment.

Referring to FIG. 16C, according to an embodiment, the stylus pen 201 may receive an input of pushing the second button (e.g., the second button 337 of FIG. 3B) in step 1611. According to an embodiment, the stylus pen 201 may transmit a control signal (e.g., the button of FIG. 5) corresponding to the second button input signal which is an electrical signal by the pushing of the second button 337 to the second wireless communication circuit (e.g., the second wireless communication circuit 403 of FIG. 4).

According to an embodiment, the stylus pen 201 may identify whether the first button (e.g., the first button 201a of FIG. 2) is in the pulled state in step 1621. According to an embodiment, the stylus pen 201 (e.g., the second wireless communication circuit 403 of FIG. 4 or the processor 220 of FIG. 3A) may identify that the first button 201a is in the pulled state when the first button input signal produced by the pushing of the first button 201a is received and that the first button is in the pushed state when the first button input signal is not received. According to an embodiment, in a case where the first button 201a is implemented as shown in FIG. 20, the stylus pen 201 (e.g., the second wireless communication circuit 403 of FIG. 4 or the processor 220 of FIG. 3A) may identify the identifier (e.g., the flag value) which is changed from 1 to 0 or from 0 to 1 whenever the first button input signal is received, thereby identifying whether the first button 201a is in the pulled state or the pushed state. For example, the first button 201a may be in the pulled state when the identifier is 1 and in the pushed state when the identifier is 0. According to an embodiment, the stylus pen 201 may perform step 1631 when the first button is in the pulled state and may perform step 1651 unless the first button is in the pulled state (e.g., when the first button is in the pushed state).

According to an embodiment, the stylus pen 201 may identify whether the stylus pen 201 is positioned within a proximate range from the electronic device in step 1631. According to an embodiment, when the proximity signal is received from the electronic device (e.g., the electronic device 101 of FIG. 1), the stylus pen 201 may identify that the stylus pen 201 is positioned within the proximate range (e.g., 10 cm) from the electronic device 101 and, unless the proximity signal is received, may identify that the stylus pen 201 is positioned out of the proximate range from the electronic device 101. According to an embodiment, upon receiving the proximity signal, the stylus pen 201 may transmit a control signal (e.g., the approach of FIG. 5) corresponding to the proximity signal to the second wireless communication circuit 403. According to an embodiment, unless the stylus pen 201 is positioned within the proximate range from the electronic device 101 (e.g., when the stylus pen 201 is positioned out of the proximate range), the stylus pen 201 may perform step 1641 and, when positioned within the proximate range, the stylus pen 201 may perform step 1651.

According to an embodiment, the stylus pen 201 may transmit the BLE signal in step 1641. According to an embodiment, upon identifying that the stylus pen 201 is not positioned within the proximate range from the electronic device 101, the stylus pen 201 may transmit the BLE signal (e.g., the fourth signal) using the second wireless communication circuit 403 in response to the pushing of the second button 337.

According to an embodiment, the stylus pen 201 may transmit the EMR signal in step 1651. According to an embodiment, upon identifying that the first button 201a is not in the pulled state (e.g., the first button 201a is in the pushed state) or the stylus pen 201 is positioned within the proximate range from the electronic device 101, the stylus pen 201 may transmit the EMR signal (e.g., the third signal) to the electronic device 101 using the fourth wireless communication circuit 405. In this case, for example, although receiving the input of pushing the second button 337, the stylus pen 201 may refrain from transmitting the BLE signal to the electronic device 101 using the second wireless communication circuit 403 and may transmit the EMR signal using the fourth wireless communication circuit 405.

Figure 17:
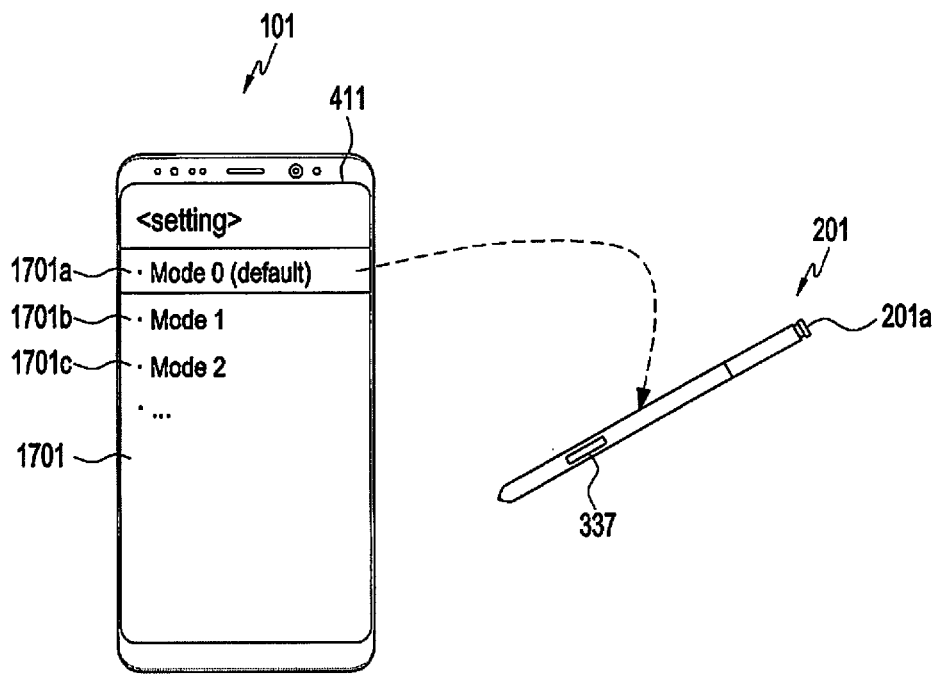
FIG. 17 is a view illustrating a method of operation of an electronic device to set a wireless communication scheme by pushing a second button of a stylus pen according to an embodiment.

FIG. 17 is a view illustrating a method of operation of an electronic device 101 to set a wireless communication scheme by the pushing of a second button 337 of a stylus pen 201 according to an embodiment.

Referring to FIG. 17, according to an embodiment, the processor (e.g., the processor 120 of FIG. 1) may display, on the display 411, a user interface 1701 for setting a wireless communication scheme (e.g., an EMR communication scheme or BLE communication scheme) by the pushing of the second button 337. According to an embodiment, the user interface 1701 may be displayed to include a plurality of graphical objects (e.g., a first graphical object 1701a, a second graphical object 1701b, or a third graphical object 1701c). According to an embodiment, the plurality of graphical objects (e.g., the first graphical object 1701a, the second graphical object 1701b, or the third graphical object 1701c) each may indicate the settings of a wireless communication scheme corresponding to each of the plurality of graphical objects (e.g., the first graphical object 1701a, the second graphical object 1701b, or the third graphical object 1701c).

According to an embodiment, the processor 120 may receive an input of selecting the first graphical object 1701a by the user through the display 411.

According to an embodiment, upon receiving the input of selecting the first graphical object 1701a by the user, the processor 120 may transmit a fifth signal for controlling the operation of the second button 337 in the settings of the wireless communication scheme corresponding to the first graphical object 1701a to the second wireless communication circuit (e.g., the second wireless communication circuit 403 of FIG. 4) of the stylus pen 201 using the first wireless communication circuit (e.g., the first wireless communication circuit 407 of FIG. 4). For example, according to an embodiment, the settings of the wireless communication scheme corresponding to the first graphical object 1701a may be settings to allow the first button 201a to be operated as a BLE input button and the second button 337 to be operated as an EMR input button (e.g., the settings in which when the first button 201a is pushed, the stylus pen 201 transmits a BLE signal to the electronic device 101 and, when the second button 337 is pushed, the stylus pen 201 transmits an EMR signal to the electronic device 101).

According to an embodiment, the stylus pen 201 may receive the fifth signal from the electronic device 101 using the second wireless communication circuit 403.

According to an embodiment, after receiving the fifth signal, the stylus pen 201 may receive the user's input of pushing the second button 337. In this case, as the second button 337 (e.g., a switch) is shorted as shown in FIG. 5, the capacitance of the first wireless communication circuit 407 may be varied, and an EMR signal (e.g., the third signal) may be transmitted (e.g., an AC current may be induced) from the EMR coil (e.g., the coil 313 of FIG. 3B) to the third wireless communication circuit 409.

According to an embodiment, upon receiving the user's input of pushing the second button 337 of the stylus pen 201, an electrical signal (e.g., the second button input signal) according to the pushing of the second button 337 may be transmitted through the button input processing circuit (e.g., the button input processing circuit 401 of FIG. 4) to the second wireless communication circuit 403. According to an embodiment, although the second button input signal is received after the fifth signal is received using the second wireless communication circuit 403, the stylus pen 201 may not transmit the BLE signal (e.g., the fourth signal) to the first wireless communication circuit 407.

According to an embodiment, upon receiving the user's input of pushing the first button 201a of the stylus pen 201, an electrical signal (e.g., the first button input signal) according to the pushing of the first button 201a may be transmitted through the button input processing circuit 401, or directly (e.g., without relying on the button input processing circuit 401), to the second wireless communication circuit 403. According to an embodiment, the stylus pen 201 may transmit the BLE signal (e.g., the second signal) to the first wireless communication circuit 407 in response to the first button input signal received using the second wireless communication circuit 403.

According to an embodiment, upon receiving the input of selecting the first graphical object 1701a through the display 411, the electronic device (e.g., the processor 120 of FIG. 1) may set a processing scheme for the signal (e.g., the EMR signal or BLE signal) received from the stylus pen 201. For example, the electronic device (e.g., the processor 120 of FIG. 1) may disregard (e.g., refrain from processing) the fourth signal transmitted in the BLE communication scheme by the pushing of the second button 337 from the stylus pen 201 using the second wireless communication circuit 403 and may perform processing on the second signal transmitted in the BLE communication scheme by the pushing of the first button 201a.

According to an embodiment, the wireless communication scheme corresponding to the second graphical object 1701b or the third graphical object 1701c is not limited to the wireless communication schemes by the pushing of the first button 201a or the second button 337 as set forth herein but may rather include other various communication schemes.

Figure 18:
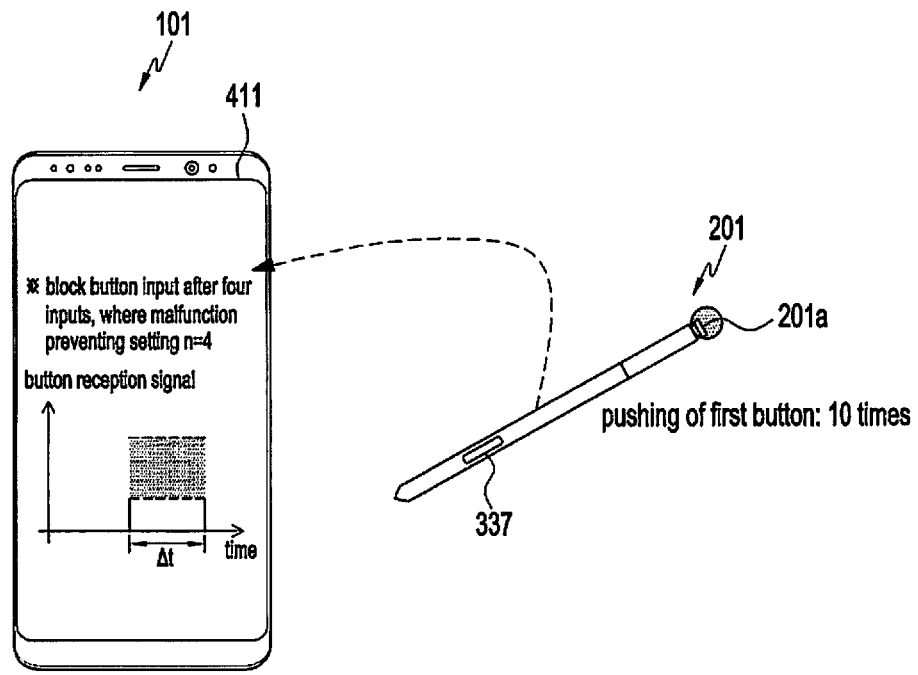
FIG. 18 is a view illustrating a method of operation of an electronic device when a first button of a stylus pen is pushed a predesignated number of times or more within a predesignated time according to an embodiment.

FIG. 18 is a view illustrating an operation method of an electronic device (e.g., the electronic device 101 of FIG. 1) when a first button (e.g., the first button 201a of FIG. 2) of a stylus pen (e.g., 201 of FIG. 2) is pushed multiple times within a predesignated time according to an embodiment.

Referring to FIG. 18, according to an embodiment, the stylus pen 201 may receive an input of pushing the first button 201a multiple times (e.g., ten times) from the user. In this case, an electrical signal (e.g., the first button input signal) produced as the first button 201a (e.g., a switch) is pushed may be transferred multiple times through the button input processing circuit (e.g., the button input processing circuit 401 of FIG. 4), or directly, to the second wireless communication circuit (e.g., the second wireless communication circuit 403 of FIG. 4).

According to an embodiment, the stylus pen 201 may receive a plurality of first button input signals continuously transferred multiple times using the second wireless communication circuit 403. According to an embodiment, the stylus pen 201 may transmit the BLE signal (e.g., the second signal) multiple times to the first wireless communication circuit (e.g., the first wireless communication circuit 407 of FIG. 4) of the electronic device 101 in response to each of the first button input signals transferred multiple times (e.g., ten times) using the second wireless communication circuit 403. According to an embodiment, upon receiving the BLE signal (e.g., the second signal) a number of times (e.g., six times) exceeding a predesignated number of times (e.g., four times) within a preset time (e.g., four seconds) through the first wireless communication circuit 407, the electronic device (e.g., the processor 120 of FIG. 1) may perform processing (e.g., performing a predesignated task (e.g., executing a camera application)) on the BLE signal (e.g., the second signal) the predesignated number of times (e.g., four times) and disregard. (e.g., refrain from processing on) the BLE signal (e.g., the second signal) received the predesignated number of times later.

According to an embodiment, the stylus pen 201 may receive first button input signals continuously transferred multiple times using the second wireless communication circuit 403. According to an embodiment, the stylus pen 201 may identify whether the first button input signals transferred multiple times (e.g., ten times) using the second wireless communication circuit 403 are received a number of times exceeding a predesignated number of times (e.g., four times) within a predesignated time (e.g., four seconds). According to an embodiment, the stylus pen 201 may disregard the first button input signals received after the predesignated number of times using the second wireless communication circuit 403. In this case, the stylus pen 201 may transmit the BLE signal to the first wireless communication circuit 407 using the second wireless communication circuit 403 a predesignated number of times (e.g., four times) but may refrain from transmitting the BLE signal a number of times (e.g., six times) exceeding the predesignated number of times.

According to an embodiment, the predesignated number of times may be varied by the user's input through the electronic device 101 and is not limited to four times as mentioned above.

Figure 19:
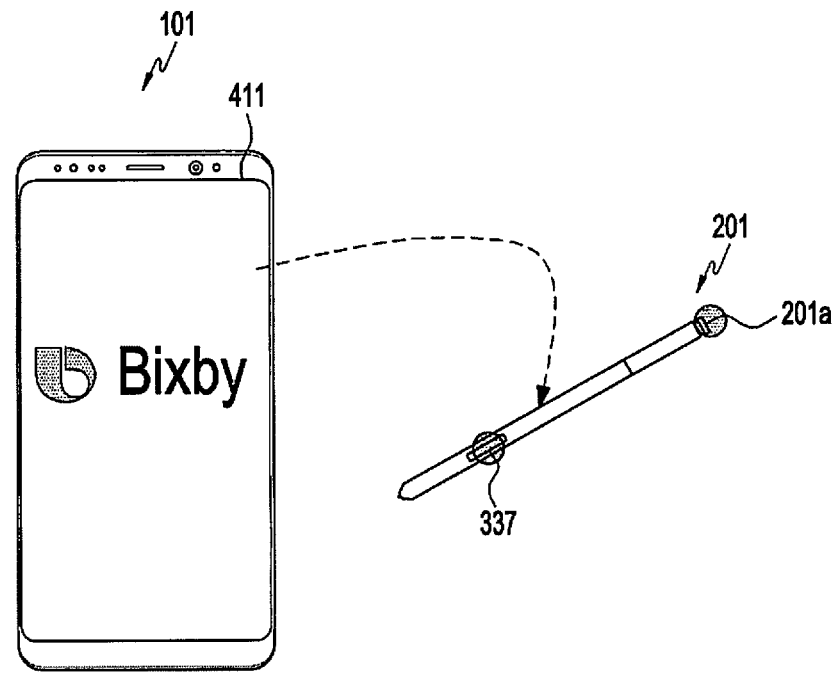
FIG. 19 is a view illustrating a method of operation of an electronic device when both a first button and a second button of a stylus pen are pushed within a predesignated time according to an embodiment.

FIG. 19 is a view illustrating an operation method of an electronic device when both a first button (e.g., the first button 201a of FIG. 2) and second button (e.g., the second button 337 of FIG. 3B) of a stylus pen (e.g., 201 of FIG. 3B) are pushed within a predesignated time, according to an embodiment.

Referring to FIG. 19, according to an embodiment, the stylus pen 201 may receive a user's input of pushing the first button 201a and the user's input of pushing the second button 337 simultaneously or within a predesignated proximate time (e.g., 1 second). According to an embodiment, the stylus pen 201 may receive a first button input signal corresponding to the user's input of pushing the first button 201a and a second button input signal corresponding to the user's input of pushing the second button 337 using the second wireless communication circuit (e.g., the second wireless communication circuit 403 of FIG. 4) or the fourth wireless communication circuit (e.g., the fourth wireless communication circuit 405 of FIG. 4). According to an embodiment, the first button input signal and the second button input signal may indicate electrical signals produced as the respective switch circuits of the first button 201a and the second button 337 are open or shorted.

According to an embodiment, the stylus pen 201 may transmit each of a first BLE signal (e.g., the second signal or first button pushing signal) corresponding to the input of pushing the first button 201a of the electronic device 101 and a second BLE signal (e.g., the fourth signal) corresponding to the input of pushing the second button 337 using the second wireless communication circuit 403. According to an embodiment, the transmission of the first BLE signal and the second BLE signal from the second wireless communication circuit 403 to the electronic device 101 may be performed via Bluetooth, BLE, or Wi-Fi or via Wi-Fi direct, NFC, or other short-range communication schemes.

According to an embodiment, the electronic device (e.g., the processor 120 of FIG. 1) may receive the first BLE signal and the second BLE signal using the first wireless communication circuit (e.g., the first wireless communication circuit 407 of FIG. 4).

According to an embodiment, the electronic device (e.g., the processor 120 of FIG. 1) may identify whether the first BLE signal and the second BLE signal have been received within the predesignated time interval.

According to an embodiment, upon identifying that the first BLE signal and the second BLE signal have been received within the preset time interval, the electronic device (e.g., the processor 120 of FIG. 1) may perform predesignated processing. For example, according to an embodiment, the predesignated processing may include performing at least one of preset tasks (e.g., executing the voice assistant function through an intelligent application). For example, according to an embodiment, upon receiving the first BLE signal and the second BLE signal within the predesignated time interval (e.g., 2 seconds), the electronic device (e.g., the processor 120 of FIG. 1) may execute a preset voice assistant function (e.g., executing Samsung Bixby™ application) According to an embodiment, as the voice assistant function is executed, the processor 120 may activate the microphone (e.g., the input device 150 of FIG. 1) included in the electronic device 101. According to an embodiment, the processor 120 may identify at least one of the position or direction in which the first BLE signal and the second BLE signal have been received. According to an embodiment, the processor 120 may control the microphone to have an increasing voice input gain based on at least one of the identified direction or position. According to an embodiment, the processor 120 may perform the operation of reducing the incoming noise by beamforming (e.g., adjusting the directivity of the microphone by identifying the beam pattern of voice input) or increasing the voice input gain of the microphone based on at least one of the identified direction or position.

According to an embodiment, the stylus pen 201 may receive both the user's input of pushing the first button 201a (e.g., the first button input signal) and input of pushing the second button 337 (e.g., the second button input signal) within a predesignated time in the button input processing circuit 401. According to an embodiment, the stylus pen 201 may transmit the received first button input signal and second button input signal to the second wireless communication circuit 403. According to an embodiment, when the second wireless communication circuit 403 receives both the first button input signal and the second button input signal within the predesignated time, the stylus pen 201 may transmit a command signal for instructing to perform a preset task or execute a preset application to the first wireless communication circuit 407 using the second wireless communication circuit 403. Thus, the processor 120 of the electronic device 101 may perform processing corresponding to the command signal received from the second wireless communication circuit 403.

FIG. 20 is a view illustrating producing an input signal as a user pushes a first button.

Referring to the left side of FIG. 20, if the user pushes the first button 201a (e.g., operation a_1), with the first button 201a popped down initially (e.g., operation a_0), then the shaft 321 may contact the switch structure (e.g., the switch structure 810 of FIG. 8). In a subsequent operation (e.g., operation a_2), the first button 201a may be popped up by the combined elastic repulsive forces of the elastic members (e.g., 325a and 325b of FIG. 7) disposed in the ejection member 320.

Referring to the right side of FIG. 20, if the user pushes the first button 201a (e.g., operation b_1), with the first button 201a popped up initially (e.g., operation b_0), then the shaft 321 may contact the switch structure 810. In a subsequent operation (e.g., operation b_2), the first button 201a may be popped down by the elastic repulsive forces of the elastic member (e.g., 325 of FIG. 7) disposed in the ejection member 320. In operations b_0 to b_2, unlike operations a_0 to a_2, the first button 201a may be projected only a predetermined distance from the ejection body 322.

As shown in FIG. 20, the shaft 321 and the switch structure 810 may contact only in the two operations (operation a_1 and operation b_1) so that a button input may be produced. According to an embodiment, the stylus pen (e.g., 201 of FIG. 3) may be designed so that power consumption occurs only in the two operations (operation a_1 and operation b_1). However, as the button input signal (e.g., the first button input signal), two or more distinct button input signals may be produced by a predesignated button input algorithm (e.g., a button input algorithm considering the degree of pushing of the first button 201a and/or the initial state of the first button 201a).

According to an embodiment, methods of producing the input of pushing the first button 201a (e.g., the first button input signal) are not limited to those described above. More various embodiments may be applicable depending on the initial state of the first button 201a and/or the degree of pushing of the first button 201a, and various button input signals (e.g., the first button input signal) may be produced by selecting from or combining the embodiments.

Figure 21:
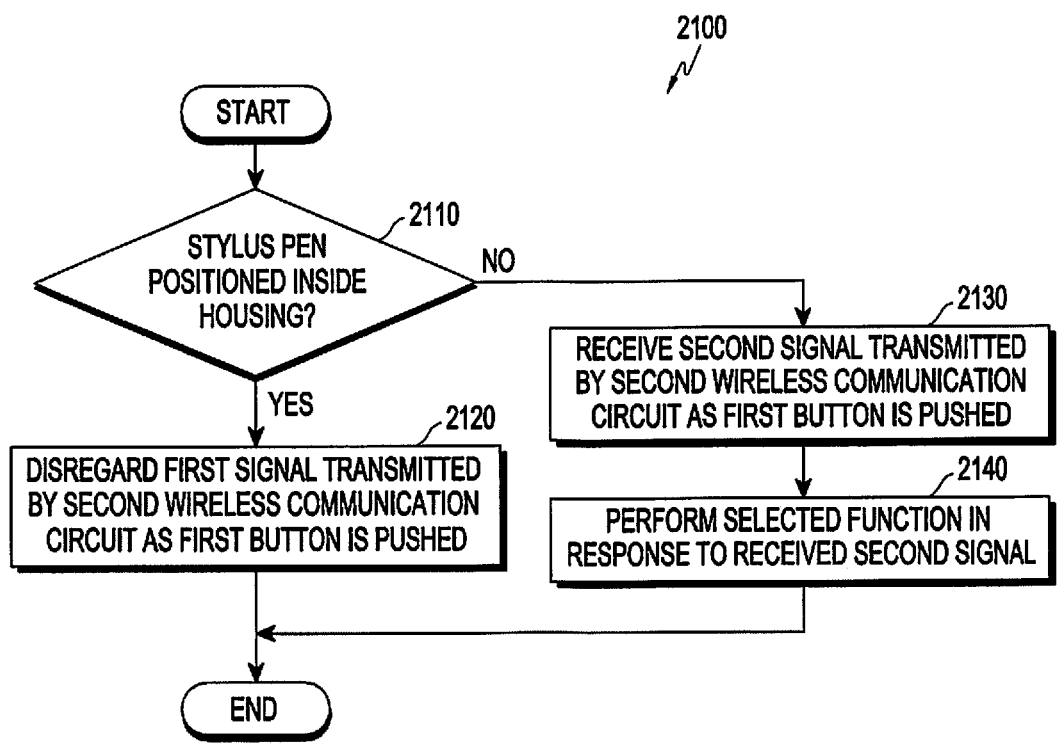
FIG. 21 is a flowchart of a method of operation of an electronic device depending on whether a stylus pen is positioned inside the electronic device according to an embodiment.

FIG. 21 is a flowchart 2100 illustrating a method of operation of an electronic device (e.g., the electronic device 101 of FIG. 1) depending on whether a stylus pen (e.g., 201 of FIG. 3B) is positioned inside the electronic device (e.g., the electronic device 101 of FIG. 1) according to an embodiment.

Referring to FIG. 21, according to an embodiment, the electronic device (e.g., the electronic device 101 of FIG. 1) may identify whether the stylus pen (e.g., 201 of FIG. 3B) is positioned inside a housing (e.g., the housing 210 of FIG. 2) in step 2110. According to an embodiment, the electronic device (e.g., the electronic device 101 of FIG. 1) may perform step 2120 when the stylus pen (e.g., 201 of FIG. 3B) is in the state of being positioned inside the housing (e.g., the housing 210 of FIG. 2) and perform step 2130 unless the stylus pen (e.g., 201 of FIG. 3B) is positioned inside the housing (e.g., the housing 210 of FIG. 2) (e.g., when the stylus pen (e.g., 201 of FIG. 3B) is positioned outside the housing (e.g., the housing 210 of FIG. 2)).

According to an embodiment, the electronic device (e.g., the electronic device 101 of FIG. 1) may disregard a first signal transmitted by the second wireless communication circuit (e.g., the second wireless communication circuit 403 of FIG. 4) by pushing of the first button (e.g., the first button 201a of FIG. 2) in step 2120.

According to an embodiment, the electronic device (e.g., the electronic device 101 of FIG. 1) may receive a second signal transmitted by the second wireless communication circuit (e.g., the second wireless communication circuit 403 of FIG. 4) by pushing of the first button (e.g., the first button 201a of FIG. 2) in step 2130.

According to an embodiment, the electronic device (e.g., the electronic device 101 of FIG. 1) may perform a selected function in response to the received second signal in step 2140.

According to an embodiment, an electronic device (e.g., the electronic device 101 of FIG. 1) includes a housing (e.g., the housing 210 of FIG. 2) including a first inner space (e.g., the first inner space 212 of FIG. 2) and a hole (e.g., the hole 211 of FIG. 2) connected with the first inner space, a first wireless communication circuit (e.g., the first wireless communication circuit 407 of FIG. 4) positioned inside the housing, a stylus pen (e.g., the stylus pen 201 of FIG. 2) insertable into the first inner space through the hole, the stylus pen including an elongated pen housing (e.g., the pen housing 300 of FIG. 3B) including an elongated second inner space (e.g., the second inner space 301 of FIG. 3B) between a first end (e.g., the first end 300*a* of FIG. 3B) and a second end (e.g., the second end 300*b*), a pen tip (e.g., the pen tip 311 of FIG. 3B) disposed at the first end, a pushable first button (e.g., the first button 201*a* of FIG. 2) disposed at the second end, and a second wireless communication circuit (e.g., the second wireless communication circuit 403 of FIG. 4) positioned inside the pen housing and configured to wirelessly transmit and/or receive a signal to/from the first wireless communication circuit, a processor (e.g., the processor 120 of FIG. 1) positioned inside the housing and operatively connected with the first wireless communication circuit, and a memory (e.g., the memory 130 of FIG. 1) positioned inside the housing and operatively connected with the processor, wherein the memory is configured to store instructions that, when executed, enable the processor to disregard a first signal transmitted by the second wireless communication circuit as the first button is pushed while the stylus pen is in the housing, receive a second signal transmitted by the second wireless communication circuit as the first button is pushed while the stylus pen is outside the housing, and perform a selected function in response to the received second signal.

According to an embodiment, the electronic device may further include a third wireless communication circuit (e.g., the third wireless communication circuit 409) positioned inside the housing, a fourth wireless communication circuit (e.g., the fourth wireless communication circuit 405 of FIG. 4) positioned inside the pen housing and configured to wirelessly transmit and/or receive a signal to/from the third wireless communication circuit, and a second button (e.g., the second button 337 of FIG. 3) disposed on an outer surface of the pen housing and operatively connected with the fourth wireless communication circuit.

According to an embodiment, the electronic device may further include a charging circuit (e.g., the charging circuit 288 of FIG. 3A). The instructions enable the processor to detect that the stylus pen is positioned inside the housing based on at least part of an operation of the charging circuit.

According to an embodiment, the instructions enable the processor to, while the stylus pen is positioned within a predetermined distance from the electronic device, receive, through the third wireless communication circuit, a third signal transmitted by the fourth wireless communication circuit as the second button is pushed and perform a selected function in response to the received third signal and, while the stylus pen is positioned out of the predetermined distance from the electronic device, receive, through the first wireless communication circuit, a fourth signal transmitted by the second wireless communication circuit as the second button is pushed and perform a selected function in response to the received fourth signal.

According to an embodiment, the stylus pen (e.g., 201 of FIG. 3B) may include a sealed internal structure (e.g., 800 of FIG. 8) positioned in the second inner space (e.g., 301 of FIG. 3B), forming an elongated third inner space (e.g., 801 of FIG. 8), and including a third end oriented towards the second end (e.g., 300*b* of FIG. 3B), a pushable switch structure (e.g., 810 of FIG. 8) disposed at the third end, and a shaft (e.g., 321 of FIG. 8) positioned between the switch structure and the first button in the second inner space.

According to an embodiment, the shaft may extend from the third end to the second end along an axis of a first direction, be connected with the first button, and be configured to linearly move in the first direction depending on whether the first button is pushed. The switch structure may be configured to convert a pushing by the shaft into an electrical signal.

According to an embodiment, the stylus pen may include a conductive portion positioned in the second inner space and electrically connecting the switch structure and the fourth wireless communication circuit and a waterproof structure positioned in an area corresponding to the conductive portion which is positioned on an outer surface of the internal structure. According to an embodiment, the switch structure may include a switch (e.g., 811 of FIG. 8) and a switch board (e.g., 812 of FIG. 8) on which the switch is mounted. The switch board may extend onto the outer surface of the internal structure.

According to an embodiment, the shaft may include at least two shafts (e.g., 321 and 321' of FIG. 12) which are positioned adjacent each other along a lengthwise direction of the pen housing. A shaft (e.g., 321' of FIG. 12) of the at least two shafts, which contacts the switch structure, may be formed of a harder material than the rest (e.g., 321' of FIG. 12) of the at least two shafts.

According to an embodiment, the switch structure may include a switch and a switch board on which the switch is mounted. The stylus pen may include a waterproof structure (e.g., 870 of FIG. 10 or 870 of FIG. 11) positioned in an area corresponding to a conductive portion between the switch and the switch board.

According to an embodiment, the switch structure may include a switch and a switch board on which the switch is mounted. The switch board may include a conductive portion extending through the third end of the internal structure to the third inner space and electrically connecting the switch structure and the fourth wireless communication circuit. The stylus pen may include a waterproof structure (e.g., 1120 of FIG. 11) to waterproof the conductive portion in the third inner space.

According to an embodiment, the electronic device may further include a printed circuit board (PCB) in the third inner space. The second wireless communication circuit and the fourth wireless communication circuit may be mounted on the PCB.

According to an embodiment, the instructions enable the processor to perform a selected function corresponding to a pushing of the second button based on at least part of at least one of a state or count of pushing of the first button.

According to an embodiment, the first wireless communication circuit and the second wireless communication circuit may be configured to support a Bluetooth standard or a BLE standard, and the third wireless communication circuit and the fourth wireless communication circuit may be configured to support EMR communication.

According to an embodiment, the electronic device may further include a user interface. The second button may be operatively connected with the second wireless communication circuit. The instructions enable the processor to receive, through the user interface, a first user input for controlling the stylus pen to refrain from transmitting a fourth signal as the second button is pushed and, in response to the received first user input, transmit, through the first wireless communication circuit to the second wireless communication circuit, a fifth signal for controlling the stylus pen to refrain from the fourth signal as the second button is pushed.

According to an embodiment, the electronic device may further include a user interface. The second button may be operatively connected with the second wireless communication circuit. The instructions enable the processor to receive, through the user interface, a first user input for setting a communication scheme with the stylus pen, after receiving the first user input, disregarding a fourth signal transmitted from the second wireless communication circuit as the second button is pushed, and after receiving the first user input, upon receiving the second signal transmitted from the second wireless communication circuit as the first button is pushed, perform a selected function corresponding to the received second signal.

According to an embodiment, the instructions enable the processor to receive, from the second wireless communication circuit, the second signal a predesignated number of times within a first predesignated time while the stylus pen is outside the housing, after receiving the second signal the predesignated number of times within the first predesignated time, further receive the second signal transmitted from the stylus pen as the first button is pushed, and disregard the further received second signal.

According to an embodiment, the instructions enable the processor to execute a predesignated intelligent application upon receiving both the second signal transmitted from the second wireless communication circuit and a fourth signal transmitted from the fourth wireless communication circuit, within a second predesignated time while the stylus pen is outside the housing.

According to an embodiment, the instructions enable the processor to receive a signal of indicating a pushing of the first button from the second wireless communication circuit while the stylus pen is outside the housing and, after receiving the signal of indicating the pushing of the first button, disregard a fourth signal transmitted by the second wireless communication circuit in response to a pushing of the second button using the fourth wireless communication circuit.

According to an embodiment, an electronic device includes a housing including a first inner space and a hole connected with the first inner space, a first wireless communication circuit positioned inside the housing, a first charging circuit positioned inside the housing, a stylus pen insertable into the first inner space through the hole, the stylus pen including an elongated pen housing including an elongated second inner space between a first end and a second end, a pen tip disposed at the first end, a pushable first button disposed at the second end, a second charging circuit positioned inside the pen housing, and a second wireless communication circuit positioned inside the pen housing and configured to wirelessly transmit and/or receive a signal to/from the first wireless communication circuit, a processor positioned inside the housing and operatively connected with the first wireless communication circuit, and a memory positioned inside the housing and operatively connected with the processor, wherein the memory is configured to store instructions that, when executed, enable the processor to transmit a detection signal for identifying whether the stylus pen is in the housing to the second charging circuit using the first charging circuit, receive a response signal from the second charging circuit in response to the transmitted detection signal, determine that the stylus pen is in the housing when a strength of the response signal is a predesignated value or more in response to the received response signal, and transmit, to the second wireless communication circuit, a second signal for controlling the second wireless communication circuit to refrain from transmitting a first signal as the first button is pushed while the stylus pen is in the housing.

According to an embodiment, the instructions enable the processor to determine that the stylus pen is outside the housing when the strength of the response signal is less than the predesignated value, receive the first signal transmitted by the second wireless communication circuit as the first button is pushed while the stylus pen is outside the housing, and perform a selected function corresponding to the first signal in response to the received first signal.

The electronic device according to various embodiments may be one of various types of electronic devices. The electronic devices may include at least one of, e.g., a portable communication device (e.g., a smartphone), a computer device, a portable multimedia device, a portable medical device, a camera, a wearable device, or a home appliance. According to an embodiment of the disclosure, the electronic device is not limited to the above-listed embodiments.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the computer 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described sub components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As is apparent from the foregoing description, according to various embodiments, in the stylus pen, the first button which may be used for removing the stylus pen is rendered to function as an input button. The second button may be operated as an EMR button or BLE button according to the state or count of pushing of the first button.

According to various embodiments, the stylus pen has the switch structure of converting the mechanical/physical input by the pushing of the first button into an electrical signal. The stylus pen has the waterproof structure in the area corresponding to the conductive portion formed between the switch structure and the circuit board part, thus preventing current leaks and corrosion due to water permeation.

According to various embodiments, the stylus pen or electronic device may use the first button of the stylus pen as a button for BLE communication, thereby enabling transmission/reception or processing of wireless signals in a wireless communication scheme (e.g., EMR wireless communication scheme or BLE wireless communication scheme) corresponding to each of the plurality of input buttons regardless of the distance between the stylus pen and the display of the electronic device.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a housing including a first inner space and a hole leading to the first inner space;
a first wireless communication circuit positioned inside the housing;
a third wireless communication circuit positioned inside the housing;
a stylus pen insertable into the first inner space through the hole, wherein the stylus pen comprises:
an elongated pen housing including a second inner space elongated between a first end and a second end,
a pen tip disposed at the first end, a pushable first button disposed at the second end,
a second button disposed on an outer surface of the elongated pen housing and operatively connected with a fourth wireless communication circuit; and
a second wireless communication circuit positioned inside the elongated pen housing and configured to wirelessly transmit and/or receive a signal to/from the first wireless communication circuit,
wherein the fourth wireless communication circuit is positioned inside the elongated pen housing and configured to wirelessly transmit or receive a signal to or from the third wireless communication circuit;
a processor positioned inside the housing and operatively connected with the first wireless communication circuit; and
a memory positioned inside the housing and operatively connected with the processor, wherein the memory is configured to store instructions that, when executed, enable the processor to:
receive a first signal transmitted by the second wireless communication circuit as the pushable first button is pushed while the stylus pen is in the housing, and disregard the received first signal, and
receive a second signal transmitted by the second wireless communication circuit as the pushable first button is pushed while the stylus pen is outside the housing, and perform a selected function in response to the received second signal.

2. The electronic device of claim 1, further comprising a charging circuit, wherein the instructions, when executed, further enable the processor to detect that the stylus pen is positioned inside the housing based on at least part of an operation of the charging circuit.

3. The electronic device of claim 1, wherein the instructions, when executed, further enable the processor to:
while the stylus pen is positioned within a predetermined distance from the electronic device, receive, through the third wireless communication circuit, a third signal transmitted by the fourth wireless communication circuit as the second button is pushed and perform a selected function in response to the received third signal, and
while the stylus pen is positioned out of the predetermined distance from the electronic device, receive, through the first wireless communication circuit, a fourth signal transmitted by the second wireless communication circuit as the second button is pushed and perform a selected function in response to the received fourth signal.

4. The electronic device of claim 1, wherein the stylus pen further includes a sealed internal structure positioned in the second inner space, forming a third inner space, and including a third end oriented towards the second end, a pushable switch structure disposed at the third end, and a shaft positioned between the pushable switch structure and the pushable first button in the second inner space.

5. The electronic device of claim 4, wherein the shaft extends from the third end to the second end along an axis of a first direction, is connected with the pushable first button, and is configured to linearly move in the first direction according to whether the pushable first button is pushed, and
wherein the pushable switch structure is configured to convert a pushing by the shaft into an electrical signal.

6. The electronic device of claim 4, wherein the stylus pen further includes a conductive portion positioned in the second inner space and electrically connecting the pushable switch structure, the fourth wireless communication circuit, and a waterproof structure positioned in an area corresponding to the conductive portion which is positioned on an outer surface of the sealed internal structure.

7. The electronic device of claim 6, wherein the pushable switch structure includes a switch and a switch board on which the switch is mounted, and
wherein the switch board extends onto the outer surface of the sealed internal structure.

8. The electronic device of claim 4, wherein the shaft includes at least two shafts which are positioned adjacent each other along a lengthwise direction of the elongated pen housing, and
wherein a shaft of the at least two shafts, which contacts the pushable switch structure, is formed of a harder material than other shafts of the at least two shafts.

9. The electronic device of claim 4, wherein the pushable switch structure includes a switch and a switch board on which the switch is mounted, and
wherein the stylus pen includes a waterproof structure positioned in an area corresponding to a conductive portion between the switch and the switch board.

10. The electronic device of claim 4, wherein the pushable switch structure includes a switch and a switch board on which the switch is mounted,
wherein the switch board includes a conductive portion extending through the third end of the sealed internal structure to the third inner space and electrically connecting the pushable switch structure the fourth wireless communication circuit, and
wherein the stylus pen further includes a waterproof structure to waterproof the conductive portion in the third inner space.

11. The electronic device of claim 4, further comprising a printed circuit board (PCB) in the third inner space, wherein the second wireless communication circuit and the fourth wireless communication circuit are mounted on the PCB.

12. The electronic device of claim 1 wherein the instructions, when executed, further enable the processor to perform a selected function corresponding to a pushing of the second button based on at least part of at least one of a state or count of pushing of the pushable first button.

13. The electronic device of claim 1, wherein the first wireless communication circuit and the second wireless communication circuit are configured to support a Bluetooth standard or a Bluetooth low energy (BLE) standard, and the third wireless communication circuit and the fourth wireless communication circuit are configured to support electromagnetic resonance (EMR) communication.

14. The electronic device of claim 1, further comprising a user interface,
wherein the second button is operatively connected with the second wireless communication circuit, and
wherein the instructions further enable the processor to receive, through the user interface, a first user input for controlling the stylus pen to refrain from transmitting a fourth signal as the second button is pushed and, in response to the received first user input, transmit, through the first wireless communication circuit to the second wireless communication circuit, a fifth signal for controlling the stylus pen to refrain from the fourth signal as the second button is pushed.

15. The electronic device of claim 1, further comprising a user interface,
wherein the second button is operatively connected with the second wireless communication circuit, and
wherein the instructions further enable the processor to receive, through the user interface, a first user input for setting a communication scheme with the stylus pen, after receiving the first user input, disregarding a fourth signal transmitted from the second wireless communication circuit as the second button is pushed, and after receiving the first user input, upon receiving the second signal transmitted from the second wireless communication circuit as the pushable first button is pushed, perform a selected function corresponding to the received second signal.

16. The electronic device of claim 1, wherein the instructions, when executed, further enable the processor to receive, from the second wireless communication circuit, the second signal a predesignated number of times within a first predesignated time while the stylus pen is outside the housing, after receiving the second signal the predesignated number of times within the first predesignated time, further receive the second signal transmitted from the stylus pen as the pushable first button is pushed, and disregard the further received second signal.

17. The electronic device of claim 1, wherein the instructions, when executed, further enable the processor to execute a predesignated intelligent application upon receiving both a fourth signal and the second signal transmitted by the second wireless communication circuit, within a second predesignated time while the stylus pen is outside the housing.

18. The electronic device of claim 1, wherein the instructions, when executed, further enable the processor to receive a signal of indicating a pushing of the pushable first button from the second wireless communication circuit while the stylus pen is outside the housing and, after receiving the signal of indicating the pushing of the pushable first button, disregard a fourth signal transmitted by the second wireless communication circuit in response to a pushing of the second button using the first wireless communication circuit.

* * * * *